United States Patent
Edwards

(10) Patent No.: US 12,175,982 B2
(45) Date of Patent: *Dec. 24, 2024

(54) SYSTEM AND METHOD FOR CUSTOMIZING SMART HOME SPEECH INTERFACES USING PERSONALIZED SPEECH PROFILES

(71) Applicant: DRNC Holdings, Inc., Wilmington, DE (US)

(72) Inventor: Keith Edwards, Atlanta, GA (US)

(73) Assignee: DRNC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,246

(22) Filed: Feb. 7, 2022

(65) Prior Publication Data

US 2022/0157320 A1    May 19, 2022

Related U.S. Application Data

(63) Continuation of application No. 16/314,845, filed as application No. PCT/US2017/039771 on Jun. 28, 2017, now Pat. No. 11,244,687.

(Continued)

(51) Int. Cl.
| | |
|---|---|
| *G10L 17/00* | (2013.01) |
| *G10L 15/22* | (2006.01) |

(Continued)

(52) U.S. Cl.
CPC ............. *G10L 17/00* (2013.01); *G10L 15/22* (2013.01); *G10L 17/02* (2013.01); *G10L 17/06* (2013.01);

(Continued)

(58) Field of Classification Search
USPC ............... 704/235, 246, 247, 251, 252, 275
See application file for complete search history.

(56) References Cited

U.S. PATENT DOCUMENTS

| | | | |
|---|---|---|---|
| 7,464,035 B2 | 12/2008 | Funk | |
| 8,983,383 B1 * | 3/2015 | Haskin | ................ H04M 1/6041 |
| | | | 455/556.1 |

(Continued)

FOREIGN PATENT DOCUMENTS

| | | |
|---|---|---|
| DE | 10063331 A1 | 7/2002 |
| KR | 101584932 B1 | 1/2016 |

OTHER PUBLICATIONS

International Search Report and Written Opinion of the International Searching Authority for PCT/US2017/039771 mailed Sep. 9, 2017, 11 pages.

(Continued)

*Primary Examiner* — Leonard Saint-Cyr
(74) *Attorney, Agent, or Firm* — Chris Kolefas

(57) ABSTRACT

Systems and methods are provided in which a speaker profile-data inquiry is transmitted to a mobile device associated with a first speaker. In response to the speaker-profile-data inquiry, speaker profile data associated with the first speaker is received. Audio data representing a voice input is received. The first speaker is identified as providing the voice input, the identification being based on a comparison of characteristics of the received audio data with the speaker profile data of a plurality of speakers for whom speaker profile data is stored. An instruction, which includes a speaker-relative signifier, is determined from the received audio data, and determining the instruction includes determining a referent of the speaker-relative signifier based on the first speaker profile data. An action indicated by the instruction is performed.

19 Claims, 12 Drawing Sheets

Related U.S. Application Data

(60) Provisional application No. 62/359,005, filed on Jul. 6, 2016.

(51) Int. Cl.
    *G10L 17/02*    (2013.01)
    *G10L 17/06*    (2013.01)
    *G10L 15/07*    (2013.01)

(52) U.S. Cl.
    CPC ........ *G10L 15/07* (2013.01); *G10L 2015/223* (2013.01); *G10L 2015/228* (2013.01)

(56) References Cited

U.S. PATENT DOCUMENTS

| | | | |
|---|---|---|---|
| 9,009,033 B2 | 4/2015 | Hon-Anderson | |
| 9,633,660 B2 | 4/2017 | Haughay | |
| 10,599,390 B1* | 3/2020 | Brahmbhatt | G06F 3/0482 |
| 2008/0235023 A1 | 9/2008 | Kennewick | |
| 2011/0295661 A1* | 12/2011 | Dodge | G06Q 10/101 |
| | | | 705/26.1 |
| 2014/0222436 A1 | 8/2014 | Binder | |
| 2014/0249817 A1 | 9/2014 | Hart | |
| 2014/0249821 A1 | 9/2014 | Kennewick | |
| 2014/0324429 A1 | 10/2014 | Weilhammer | |
| 2015/0162006 A1 | 6/2015 | Kummer | |
| 2016/0071521 A1 | 3/2016 | Haughay | |
| 2016/0085420 A1 | 3/2016 | Agarwal | |
| 2016/0269524 A1 | 9/2016 | Stottlemyer | |
| 2017/0092278 A1 | 3/2017 | Evermann | |
| 2017/0094049 A1 | 3/2017 | Kanevsky | |
| 2017/0195625 A1* | 7/2017 | Mahar | H04N 7/147 |
| 2017/0195636 A1* | 7/2017 | Child | H04L 12/2803 |
| 2017/0206064 A1* | 7/2017 | Breazeal | B25J 11/0005 |
| 2017/0242657 A1 | 8/2017 | Jarvis | |
| 2018/0025001 A1 | 1/2018 | Patel | |
| 2018/0054506 A1 | 2/2018 | Hart | |
| 2018/0061404 A1 | 3/2018 | Devaraj | |

OTHER PUBLICATIONS

International Preliminary Report on Patentability for PCT/US2017/039771 issued on Jan. 8, 2019, 7 pages.

Statt, N., "Amazon's stealth takeover of the smart home at CES 2016". The Verge, web article, available at: http://www.theverge.com/2016/1/7/10719202/amazon-alexa-ces-2016-takeover-smart-home, Jan. 7, 2016, 4 pages.

Clover, J., "Apple Finalizes HomeKit Hardware Specifications, Adds HomeKit Support to Apple TV". MacRumors.com article, available at: http://www.macrumors.com/2014/10/08/apple-homekit-specifications-finalized/, Oct. 8, 2014, 3 pages.

Slivka, E., "Siri Control of HomeKit Devices While on the Go Requires Apple TV as Hub". MacRumors.com article, available at: http://www.macrumors.com/2015/01/11/siri-homekit-apple-tv/, Jan. 11, 2015, 1 page.

Caldwell, S., "Everything you need to know about Apple TV and HomeKit". iMore article, available at: http://www.more.com/everything-you-need-know-about-apple-tv-and-homekit, Jun. 6, 2015, 5 pages.

Gales, M., et. al., "The Application of Hidden Markov Models in Speech Recognition". Foundations and Trends in Signal Processing, vol. 1, No. 3, (2007), pp. 195-304.

Amazon Echo Questions & Answers. (Sep. 23, 2015). Retrieved from https://www.facebook.com/permalink.php?id=632829106858957&story_fbid=633600950115106.

u/experts_never_lie (Jun. 27, 2015). Re: Echo two users in the same house?[Online discussion post]. Retrieved from https://www.reddit.com/r/amazonecho/comments/3bbc9f/echo_two_users_in_the_same_house/.

\* cited by examiner

SYSTEM AND METHOD FOR CUSTOMIZING SMART HOME SPEECH INTERFACES USING PERSONALIZED SPEECH PROFILES

CROSS-REFERENCE TO RELATED APPLICATIONS

This application is a continuation of U.S. application Ser. No. 16/314,845, filed on Jan. 2, 2019, now U.S. Pat. No. 11,244,687, which is a national stage application under 35 U.S.C. 371 of International Application No. PCT/US2017/039771, filed on Jun. 28, 2017, which claims benefit under 35 U.S.C. § 119(e) from U.S. Provisional Patent Application Ser. No. 62/359,005, entitled "System and Method for Customizing Smart Home Speech Interfaces Using Personalized Speech Profiles" and filed Jul. 6, 2016, all of which are incorporated herein by reference in their entirety.

BACKGROUND

Environments containing a variety of devices and/or services that are remotely controllable have increased in number and complexity. Homes, for example, are environments that have experienced such increases, and homes containing these devices and/or services are sometimes referred to as "smart homes" or "automated homes," to name two. To assist users in controlling these devices and/or services remotely, many different user interfaces have been developed. Some of these user interfaces are included in other devices that may be located in the environment. Some of these other devices allow users of the other devices to interact with the user interface with speech and to remotely control the controllable devices and/or services via spoken commands.

SUMMARY

Systems and methods are presented to improve speech-based user interfaces of multi-user speech based devices/systems. Exemplary systems and/or methods may incorporate speech profiles of individual users, the speech profiles, for example, including custom vocabularies and tuned recognition parameters. Exemplary systems and/or methods may leverage the training and/or customizing of speech-based interaction on a user's user device and/or may integrate data resulting from this training and/or customizing into the overall speech-based user interface (e.g., potentially on a temporary basis) of the multi-user speech device/system.

In an exemplary embodiment, a method is provided for accommodating multiple users into a unified speech interface associated with a home automation hub. In one such method, the presence of each user's mobile device is discovered via a discovery protocol (e.g., Bluetooth LE), and each user's speech profile is transmitted from the mobile device to the hub.

For each user whose speech profile is integrated into a unified speech interface of the hub, an integration process may be performed. In an integration process, a new "user" of the hub is created and the speech profile is associated with the new user. The working vocabulary of the unified speech interface is augmented to include specialized names from the new user's speech profile. Speech mappings are updated to account for relationship information contained in the new user's speech profile (e.g., assignment of speaker-relative signifiers like "wife," "husband," "my home," "my work" with their referents for a given user). A speech recognition algorithm is parameterized with a new user voice model.

An exemplary home automation hub adapts and personalizes to the new user and to previous users through a unified speech interface at the hub. On detection of an utterance, the utterance is compared to various stored speech profiles to determine a best match for speaker identity. A search is performed for names across combined vocabularies from multiple profiles. Names and other vocabulary items from the profile of the current speaker are prioritized over those from profiles of other users. New compound commands may be added that are derived from multiple profiles (e.g., "Play the dinner music playlist from Keith's phone," "Send a message to Keith's wife"). Use of multiple users' identities in commands may be provided for (e.g., "Start a new game between Keith and Bob" or "Which user here now has had the highest score on this game?"). Access control may be provided based on a speaker identity of a user (e.g., "Allow my wife, not my grandmother, to control the lights").

An exemplary embodiment takes the form of a method. The method includes transmitting a speaker-profile-data inquiry to a mobile device associated with a first speaker. The method also includes, in response to the speaker-profile-data inquiry, receiving speaker profile data associated with the first speaker. The method also includes receiving audio data representing a voice input. The method also includes identifying the first speaker as providing the voice input, the identification being based on a comparison of characteristics of the received audio data with the speaker profile data of a plurality of speakers for whom speaker profile data is stored. The method also includes determining an instruction from the received audio data, wherein the instruction includes a speaker-relative signifier, and wherein determining the instruction includes determining a referent of the speaker-relative signifier based on the first speaker profile data. The method also includes performing an action indicated by the instruction.

In at least one embodiment, the speaker profile data comprises voice-recognition data of the respective speaker. In at least one such embodiment, the comparison comprises a comparison of the characteristics of the received audio data with the voice-recognition data of the speaker profile data of the plurality of speakers.

In at least one embodiment, the speaker profile data comprises speaker-customized vocabulary data.

In at least one embodiment, the method further includes discovering the mobile device via a discovery protocol, wherein the speaker-profile-data inquiry is transmitted in response to discovering the mobile device.

In at least one embodiment, a home automation hub identifies the first speaker as providing the voice input.

In at least one embodiment, identifying the first speaker comprises determining a first confidence score based on the received audio data and on the first speaker profile data. In at least one such embodiment, identifying the first speaker further comprises comparing the first confidence score to a threshold confidence score. In at least one such embodiment, identifying the first speaker further comprises comparing the first confidence score to a second confidence score determined based on the received audio data and on speaker profile data associated with a user other than the first speaker.

In at least one embodiment, determining the referent of the speaker-relative signifier is further based on speaker profile data associated with a user other than the first speaker, the user being referenced in the instruction.

In at least one embodiment, the first speaker profile data comprises a mapping between the referent and the speaker-relative signifier.

In at least one embodiment, the speaker-relative signifier refers to a familial relation or a location associated with a user.

In at least one embodiment, performing the action indicated by the instruction comprises a home automation hub controlling a second device or service.

In at least one embodiment, performing the action indicated by the instruction comprises presenting multimedia content via a home automation hub.

In at least one embodiment, performing the action indicated by the instruction comprises setting a user-access control rule via a home automation hub.

Another exemplary embodiment takes the form of a system. The system includes a processor. The system also includes a non-transitory storage medium storing instructions operative, when executed by the processor, to perform the functions of: transmitting a speaker-profile-data inquiry to a mobile device associated with a first speaker; in response to the speaker-profile-data inquiry, receiving speaker profile data associated with the first speaker; receiving audio data representing a voice input; identifying the first speaker as providing the voice input, the identification being based on a comparison of characteristics of the received audio data with the speaker profile data of a plurality of speakers for whom speaker profile data is stored; determining an instruction from the received audio data, wherein the instruction includes a speaker-relative signifier, and wherein determining the instruction includes determining a referent of the speaker-relative signifier based on the first speaker profile data; and performing an action indicated by the instruction.

Moreover, any of the variations and permutations described above and/or anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments.

Furthermore, the above-listed overview of disclosed embodiments is meant to be illustrative and is not meant to be exhaustive, comprehensive, or otherwise limiting. Those of skill in the relevant art will understand this and will further understand that variations and modifications of the above-listed embodiments, and indeed of any of the disclosed embodiments, can be made without departing from the spirit or scope of the present disclosure.

DETAILED DESCRIPTION

Figure 1:
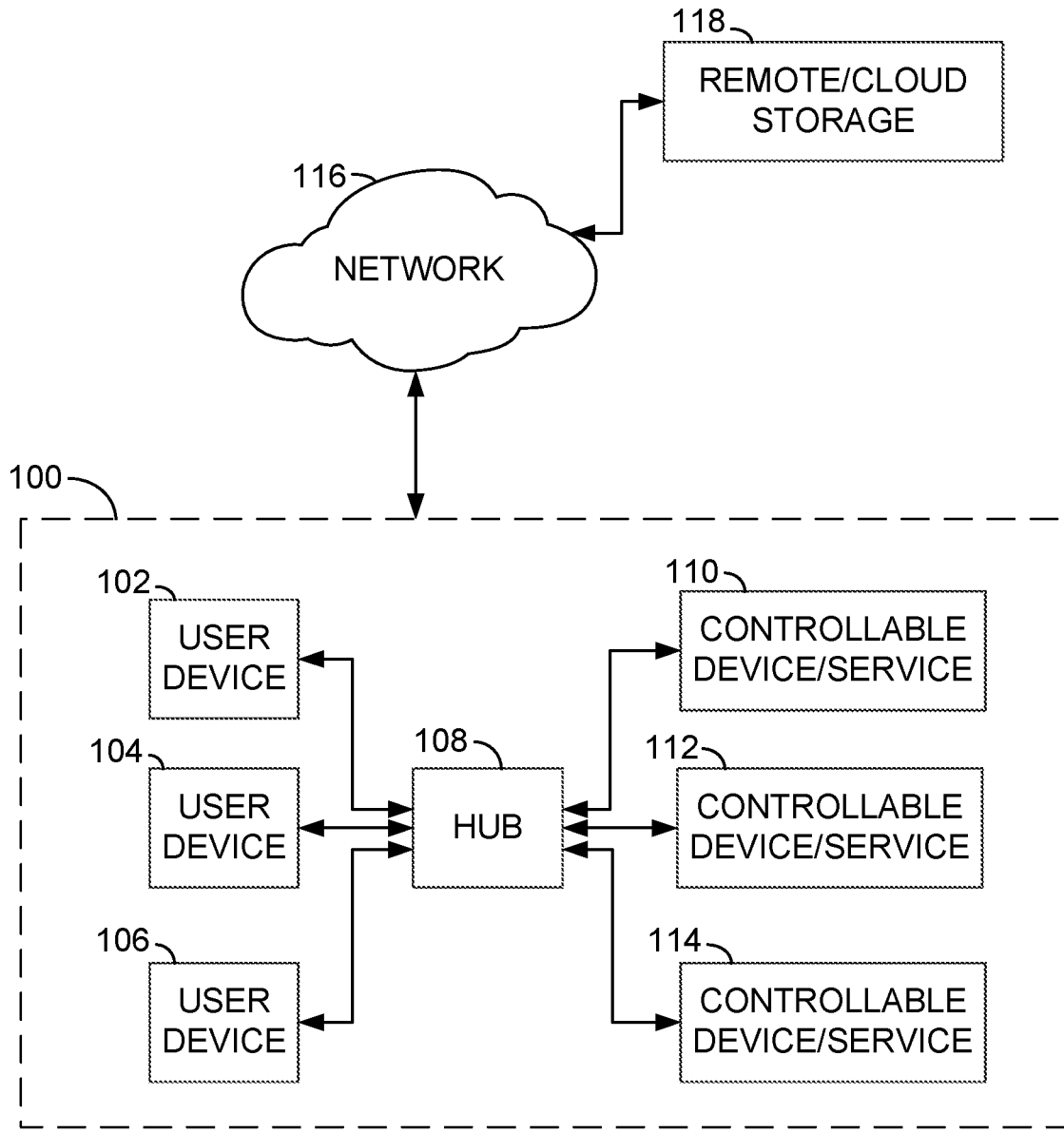
FIG. 1 is a block diagram illustrating an example system in which multi-user speech control is implemented in accordance with some embodiments.

Generally, a user interface ("UI") allows, for example, a user of the UI to interact with a device. The interaction between the user of the UI and the device, for example, allows the user of the UI to communicate with and/or control the device and/or one or more other devices that are controllable by the device.

One example of a UI is a speech-based UI, which, in part, allows the user to interact with the device, with the user's voice (e.g., allows for speech-driven control of the device). For example, the user may interact with the device by speaking an instruction to the speech-based UI associated with the device (e.g., embedded in the device, connected to the device), and based on the spoken instruction (e.g., based on the words and/or phrases in the spoken instruction), the device may execute an action corresponding to the instruction. For example, based on the spoken instruction, the device may execute an action, such as communicating with a device and/or a service, controlling a device and/or a service (e.g., transmitting control commands to a device and/or a service), configuring a device and/or a service, connecting to and/or disconnecting from a device and/or a service, receiving information, requesting information, transmitting information and/or any other suitable action.

A device having a speech-based UI (hereinafter referred to as a "speech control device") may provide speech-based control of a variety of controllable (e.g., remotely controllable) devices and/or services. Some exemplary speech control devices are: an iPhone® (e.g., an iPhone® including Siri®, such as an iPhone® 6s), an iPad®, an Apple Watch®, and an Apple TV® (e.g., the 4$^{th}$ generation of the Apple TV®) devices from Apple Inc. of Cupertino, Calif., and an Amazon Echo® device from Amazon.com, Inc. of Seattle, Wash. The speech control devices named are intended to be for exemplary purposes and are not intended to be limiting in any way.

Some speech control devices, and specifically multi-user speech devices such as the Amazon Echo, are increasing in popularity for use in smart-home control. For example, in a smart-home, occupants in a home may issue spoken commands to a speech control device (e.g., a multi-user speech device such as the Amazon Echo® device or the $4^{th}$ generation Apple TV® device and/or to a personal device, such as a mobile phone) which may then parse these commands and/or issue control messages over a network to configure smart home devices or other services into a desired state (e.g., turning lights on and/or off; playing movies, music, and/or other content, etc.). Employing multi-user speech devices as home-automation controllers (smart-home hubs) may be increasing in popularity since these devices, for example, may provide a centralized, always-listening, whole-home speech-based UI that may be used by any occupant at the home at any time. Moreover, in addition to UI functionality, these multi-user speech devices may serve as a central point of control for connecting with other devices in the home and/or cloud-based services.

Figure 9:
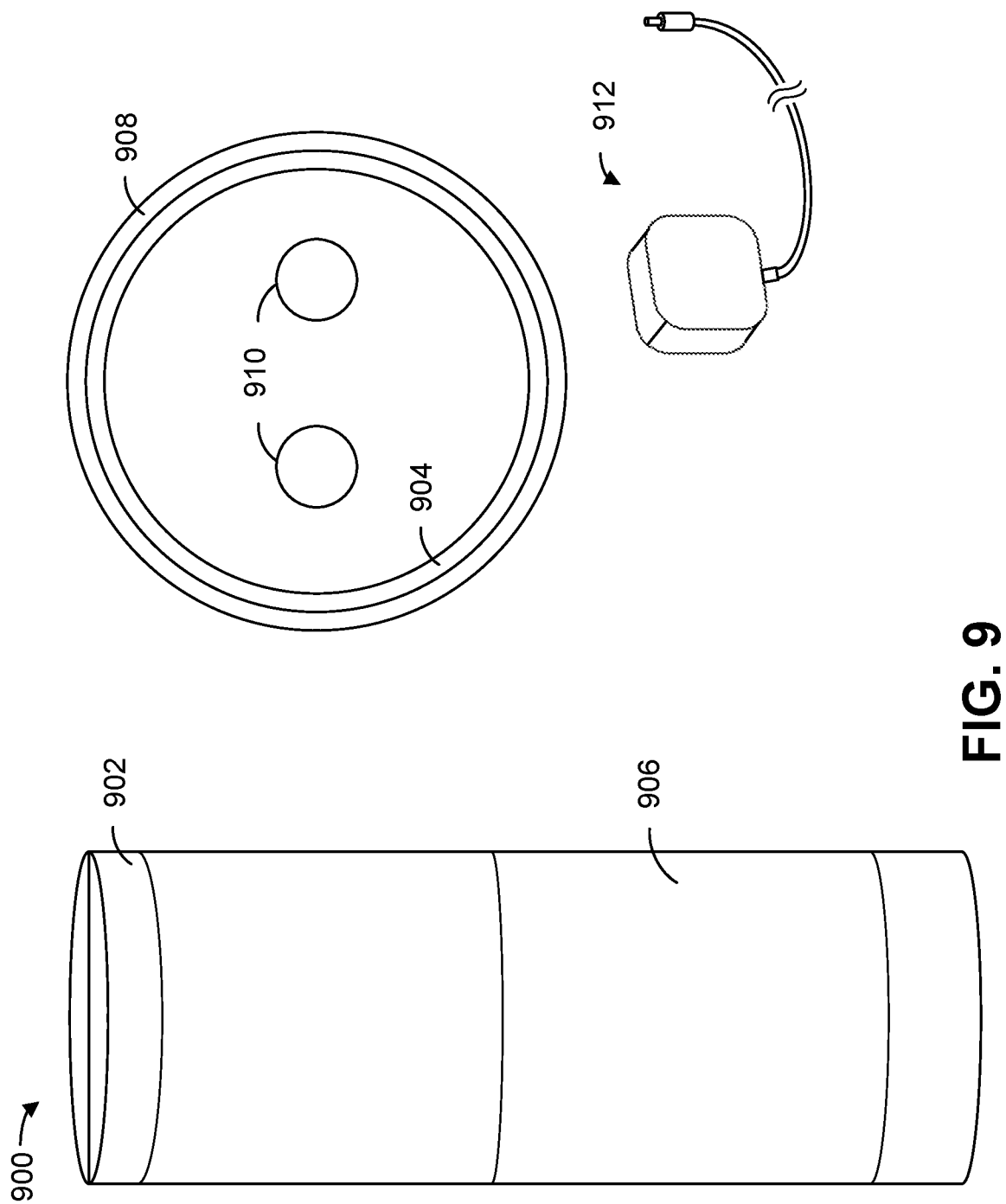
FIG. 9 illustrates an example home automation hub in accordance with some embodiments.

FIG. 9 illustrates an example home automation hub in accordance with some embodiments. The home automation hub 900 includes a volume control dial 902, microphone(s) 904, speaker(s) 906, visual indicator(s) 908, and buttons 910. The home automation hub 900 may be powered by an internal power supply and/or an external power supply. For example, the home automation hub 900 may be coupled to power adapter 912 to receive power from a power outlet or other external power supply.

The Amazon Echo® device is a centralized hub for voice-driven control of a smart home and integrates a sophisticated microphone array. The Amazon Echo® device, for example, may provide a speech-based user interface to a variety of services, such as a user's Amazon Music content (e.g., by the user speaking an instruction to "Play music by the Beatles"). In addition, the Amazon Echo® device, for example, may be able to connect to an extensible set of services provided by smart home device manufacturers such as, for example, Philips, Insteon, Wink, WeMo, and SmartThings. This extensibility may allow users to issue commands that interface with smart home devices connected to a network of the smart-home, such as "Turn down the lights" or "Turn on the heater."

Figure 10:
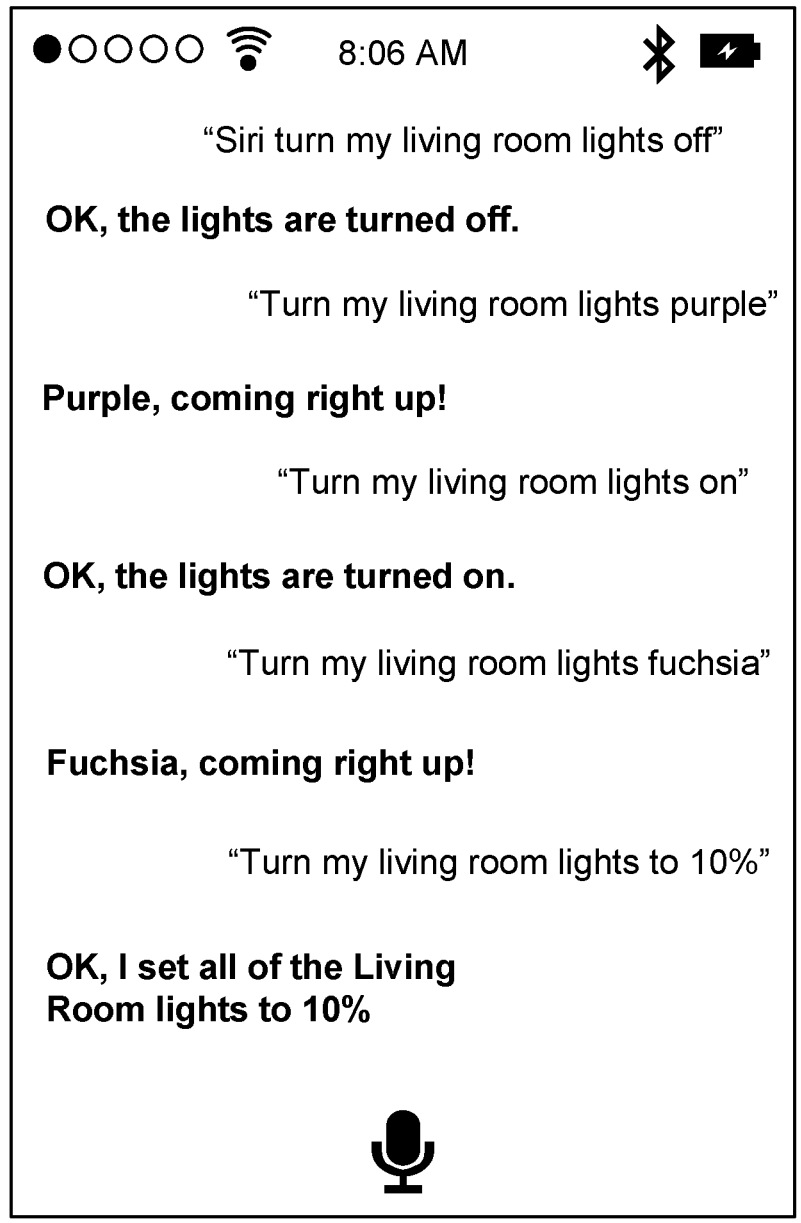
FIG. 10 is an image illustrating example interactions between a user and a version of Siri.

As another example, in Apple Inc.'s speech-based ecosystem, the digital assistant (which may be referred to as "virtual assistant," "intelligent automated assistant," or "automatic digital assistant"), Siri®, may be employed, for example, as a general purpose speech-based UI. Example Siri® commands may be general web-based queries, requests for music, and/or navigation directions, among others. For example, FIG. 10 is an image illustrating example interactions between a user and a version of Siri. In addition, Siri® may also may be employed as the overall UI to smart home devices built using Apple Inc.'s HomeKit® framework. Until Apple Inc. shipped a standalone "Home" application (analogous to the "Health" application on iOS), Siri® was the only Apple-provided means for controlling HomeKit® devices. The Apple Inc. ecosystem may allow any user present in the household employing Apple Inc.'s ecosystem to issue speech-based commands such as, for example, "Dim the lights in the dining room by 50%," "Is my garage door currently open?" or "Set the downstairs thermostat to 70."

Siri® may be available on many Apple Inc. devices and/or may be employed as an interaction modality, for example, of the Apple TV® (e.g., $4^{th}$ generation) device. In the case of the Apple TV®, Siri® may allow control over media playback via voice commands (e.g., "Watch Fast and Furious 7") provided to a remote-control handset which may include internal microphones. Further, the Apple TV® device may serve as a smart home hub for devices using Apple's HomeKit® framework. For example, to allow for control of HomeKit® devices (e.g., speech-based control) while "on the go" (e.g., while not directly connected to the home network), the Apple TV® may be connected to the home network. By employing a version of tvOS shipped in late 2015, Siri® functionality may be limited to media controls on the Apple TV®. However, since the HomeKit® may already be integrated into current and/or future Apple TV® models, the Apple TV® may eventually serve as, for example, a unified, speech-based interaction hub for the home, in which users give commands directly to the Apple TV®.

Some speech control devices, for example, by employing certain voice and/or speech recognition techniques, may generate and/or tune a speech profile of a particular user. The speech profile may, for example, describe and/or represent information related to the particular user, such as data of or related to characteristics of the particular user's voice and/or speech pattern (e.g., a vocal model, voice and/or speech recognition parameters), customization information (e.g., customized vocabulary information, customized relationship mapping information), and/or other information. Example characteristics of a user's voice and/or speech pattern may be tone, pitch, intonation, cadence, word pronunciation, sound level (e.g., decibel level), frequency, and/or the like. The characteristics of a user's voice and/or speech pattern may result for a number of reasons, which may include, for example, the user's age, gender, accent, vocal anatomy, geographic upbringing, and/or native language, among others.

The speech profile may be updated over time as the particular user exposes the speech control device, for example, to characteristics of the particular user's voice and/or to user preferences, through various interactions between the particular user and the speech control device (e.g., interactions such as, voice input spoken by the particular user, inputs related to vocabulary customization and/or relationship mapping customization). This cycle (e.g., repeated cycle) of speech interaction between the particular user and the speech control device, which may include establishing the particular user's customization instructions and/or tuning speech recognition parameters associated with the particular user, is sometimes called "training," or "customizing," the speech control device. By training/customizing the speech control device, recognition rates, for example, of the user's spoken instructions, may be improved (e.g., improved as compared to recognition rates of the user's instructions prior to and/or without training/customizing by the user), which may improve the user's satisfaction of interacting with the speech control device. In addition, by training/customizing the speech control device, the user may have a more personalized interaction with the speech control device (e.g., more personalized as compared to a speech control device prior to and/or without training/customizing by the user), which may improve the user's satisfaction of interacting with the speech control device.

Examples of data that may be used for personalized speech recognition include the data relating to adaptation and normalization of speech models as described in M.

Gales & S. Young, "The application of hidden Markov models in speech recognition," Foundations and trends in signal processing 1.3 (2008): 195-304, the entirety of which is incorporated herein by reference. As described in Gales & Young, particularly in the chapter "Adaptation and Normalization," data that may be of particular use for personalized speech recognition includes data used for Cepstral mean normalization, data for Gaussian normalization ("Gaussianisation"), data for vocal tract length normalization (VTLN), transforms for maximum likelihood linear regression (MLLR), and/or other data for improving personalized speech recognition.

In addition to training/customization of the vocal model, other sorts of user-specific customizations are possible, such as including user-specific meanings for certain words. As an example, a user device having Siri® may recognize the names that a particular user associated with the user device has given to the user's content (e.g., playlists) and/or contacts and/or may respond to those names when included in instructions spoken by the user to the user device via Siri®. Because this user device is associated with a single user, Siri® may be able to appropriately execute actions based on speech-based instructions including words and/or phrases that otherwise may be ambiguous, such as, for example, "send me a reminder" or "call my home number." Further this user device may recognize relationships that may be unique to the user. For example, if the user instructs Siri® that "Rebecca is my wife," the user may then provide a speech-based instruction to Siri® to "Text my wife that I'm running late" as the user device has created a custom mapping between the word in the user device's input vocabulary and the associated user identity.

Current voice and/or speech recognition techniques employed by the speech control devices may be designed for the described training/customizing of the speech control device to be accomplished by the particular user. These techniques may not allow for efficient training/customizing by more than one user. Some speech control devices may interact (e.g., interact via the speech-based UI associated with the speech control device) primarily with an individual user (e.g., an owner/primary possessor of the speech control device, such as a mobile phone). Conversely, some speech control devices (multi-user speech devices), such as, for example, smart-home hubs, may interact primarily with multiple users (e.g., a home automation controller/smart-home hub may interact with occupants of a home that includes the home automation controller/smart-home hub). For example, the speech-based UI, Siri®, of the mobile device, the iPhone®, may primarily interact with the owner and/or primary possessor of the iPhone® (e.g., with a single individual user). As another example, the speech-based UI, Alexa Voice Service, of the home automation controller, the Amazon Echo® device, may interact with anyone who happens to be present in the home (multiple users), such as, the occupants of the home and/or visitors to the home.

Certain speech-based features on single-user speech devices (e.g., which may increase effectiveness of recognition), may not be available on multi-user speech devices. For example, algorithmic parameters that may be used to improve recognition accuracy and/or may be learned by single-user speech devices through, for example, weeks or months of individual use, may not be available with a shared hub. Moreover, multiple users of the multi-user speech device may have different voice characteristics. As a result of these differences, for example, the multi-user speech devices may not be able to refine and/or tune voice and/or speech recognition parameters to improve recognition rates for each of the multiple users without, for example, each of the multiple users individually training and/or customizing the multi-user speech device over a period of time similar to that for the user device. Even if one of the multiple users decides to expend the time and energy to train and/or customize the multi-user speech device specific to that user's voice and speech characteristics, one or more other users of the multiple users or a new user of the multi-user speech device may not likely experience improved recognition rates and may not have access to any corresponding prior customizations. Also, because of these differences, the multi-user devices may not be able to define a single set of parameters that improves recognition rates for all of the multiple users.

As an additional example, customized vocabularies, customized relationships, or other configurations accomplished by the user of the single-user speech device may not be available on the multi-user speech devices. With the single-user device, the user may have a deeply personalized set of interactions available, such as, for example, referring to "my home" in speech-based instructions or referring to names the user may have assigned to playlists or devices. However, these customizations from the single-user speech devices may not be available on the multi-user device. If the multi-user device allows for this type of customization, for example, the customization may be a result of adapting the multi-user device's vocabularies based on the preferences of a single user of the multi-user device (e.g., the user who is logged into multi-user device with the user's Amazon ID and/or iCloud ID), rather than based on all of the multiple users of the multi-user device.

Moreover, some multi-user speech devices, for example, may not be able to determine who is speaking to the multi-user device. In some single-user speech devices (e.g., an individual user of a smart phone), an identity of a speaker may be assumed to be the owner of the phone. In contrast, some multi-user speech devices may not be able to determine identities of the individuals who make up the household. Because such a multi-user speech device may not be able to determine the identity of the speaker, certain types of speech commands may not be feasible to implement in the hub-based configuration.

In ecosystems employing these hub devices, speech may be used as a primary interaction modality by the hub device. The hub may provide access to entertainment content as well as smart home control. Further, as the number of extensible devices and services that are controllable by these hubs increase, the overall complexity of their speech-based interfaces may be required to increase as well (e.g., through additional allowable vocabulary for controlling new types of devices, for instance, as seen with the Amazon Echo® device).

As described above, the training/customizing of the speech control device may be desirable for a number of reasons. A user who has expended time and energy to train/customize the speech control device via the speech-based UI of the user's speech control device may benefit from being able to (a) incorporate the updated recognition parameters that were generated as a result of the training in other speech control devices that may interact with the user and/or (b) interact with other speech control devices via the user's customizations.

It is therefore desirable to have the data resulting from a user's training/customizing a single-user device available on multi-user devices. It is also desirable for this availability of data to be accomplished relatively quickly and/or without much effort on the part of users of the multi-user devices. To achieve such a design, embodiments herein incorporate speech profiles (e.g., generated on a user's individual mobile device) of individual users into the speech-based UI of a speech control device that may be used by multiple users.

Systems and methods disclosed herein may operate to integrate speech profiles of a plurality of users of a multi-user device. This integration of the speech profiles of the plurality of users may, among other things: (1) improve recognition rates of user identity (e.g., recognition of one user from the plurality of users) by leveraging the finely tuned algorithmic parameters which may be learned through an individual user's use over time of the user's single-user speech device and/or which may characterize the individual user's voice model; (2) improve user satisfaction, for example, by augmenting the hub's speech interface with vocabularies or other customizations that may already be used by each user on each user's single-user device (e.g., individual phone); and (3) interconnect speech applications with users' identity and/or content stored on their single-user devices, which may allow for new applications.

FIG. 1 illustrates a block diagram of an example system 100 in which multi-user speech control is implemented in accordance with some embodiments. System 100 may include user device 102, user device 104, user device 106, home automation hub 108, controllable device and/or service 110, controllable device and/or service 112, controllable device and/or service 114, network 116, and remote servers/cloud 118. In some embodiments, the system 100 may include other components not combined or included in those shown in FIG. 1 (e.g., communications circuitry, a network gateway, a network interface controller, a power supply, or a bus), or multiple instances of the components shown in FIG. 1. For the sake of simplicity, only one of some of the components is shown in FIG. 1.

As shown in FIG. 1, the system 100 may include any number of the user devices 102, 104, 106. In some embodiments, the user devices 102, 104, 106 may include the same or substantially the same components (e.g., the user devices 102, 104, 106 are mobile phones and each may be the iPhone® 6s device). In other embodiments, one or more of the user devices 102, 104, 106 may include different components (e.g., the user devices 102, 104, 106 are different devices, for example, the user device 102 is an iPhone® 6s Plus device, the user device 104 is an iPad® device, and the user device 106 is an Apple Watch® device). For the sake of simplicity, the following description that relates to the user device 102 may also be applicable to any number of the user devices 104 or the user devices 106. Similarly, the following description that includes disclosure that relates to the controllable device/service 110 may also be applicable to any number of the controllable devices/services 112 and 114.

The user device 102 may receive inputs (e.g., spoken inputs) from a user of the user device 102 (e.g., a primary user and/or possessor of the user device 102, such as, for example, an owner of the user device 102). The user device 102 may generate and/or tune a speech profile associated with the user. The generating and/or tuning of the speech profile may be, for example, based on repeated interactions between the user device 102 and the user. These interactions may include one or more inputs from the user, such as, for example, inputs that may be spoken by the user and communicated to the user device 102 through a speech-based UI of the user device 102 (e.g., a microphone included in and/or connected to the use device 102). The user's voice inputs may be provided, for example, by the user of user device 102, to direct the user device 102, for example, to carry out one or more operations. The user device 102 may be transported by the user to different environments. For example, the user device 102 may be placed in a pocket of pants worn by the user and transported to an environment, such as, for example, a home, an office, a building, a school, and/or any other suitable environment. In some embodiments, the user device 102 may store the user's speech profile and/or may have access to the user's speech profile. As a result, as the user transports the user device 102, the user may at the same time, in essence, also transport the user's speech profile (or access thereto).

As shown in FIG. 1, the hub 108 may be connected to the user device 102, the controllable device/service 110, the network 116 and/or the remote storage/cloud 118. The hub 108 may communicate wirelessly or through a wired connection to the components of the system 100. For example, in some embodiments, the hub 108 may wirelessly (e.g., via Bluetooth) communicate with the user device 102 and the controllable device/service 110, and/or the hub 108 may communicate wirelessly (e.g., via WIFI) to the network 116 and/or the remote storage/cloud 118. In some embodiments, for example, the user device 102 may communicate (e.g., directly communicate) with the network 116 (e.g., via WIFI) and/or the remote storage/cloud 118.

Figure 2:
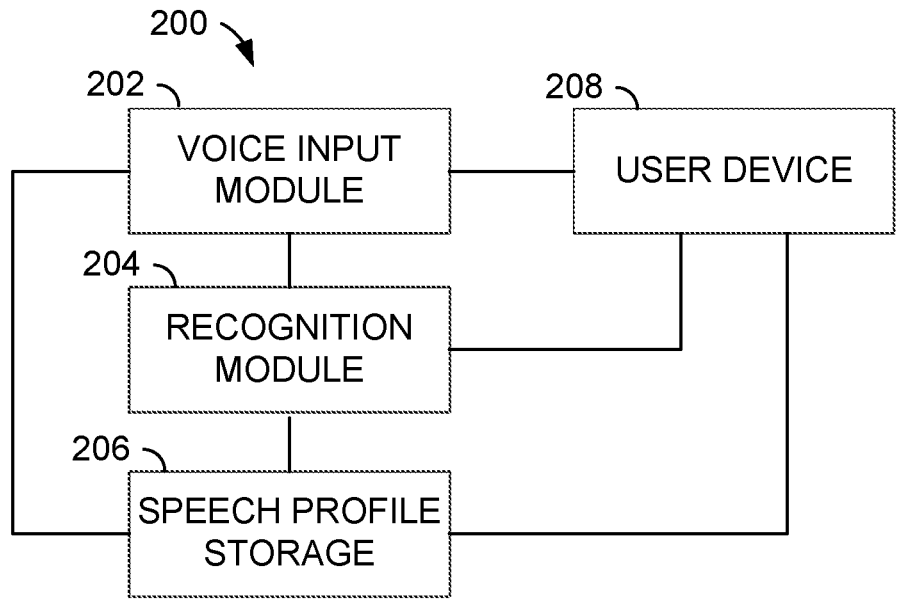
FIG. 2 is a block diagram of an example system for generating and/or tuning a speech profile of a user of a user device in accordance with some embodiments.

FIG. 2 illustrates a block diagram of an example system 200 for generating and/or tuning a speech profile of a user of a user device (e.g., of the user of the example user device 102 of FIG. 1) in accordance with some embodiments.

System 200 may include a voice input module 202, a recognition module 204, a speech profile storage 206, and a user device 208. Although the user device 208 is depicted in FIG. 2 as a separate component from the voice input module 202, the recognition module 204 and the speech profile storage 206, it will be appreciated that one or more of the voice input module 202, the recognition module 204 and the speech profile storage 206 may be totally or in part embedded in the user device 208 in any suitable combination and/or sub-combination. For example, the voice input module 202 may be included in the user device, 208, while the speech recognition module 204 may be implemented using a networked service. Additionally, in some embodiments, the user device 208 is substantially similar or identical to the user device 102 of FIG. 1.

A user of the user device 208 may provide audio data, for example, voice input spoken by the user to the voice input module 202. The voice input module 202 receives the voice input spoken by the user. For example, the voice input/output module 202 may include one or more microphones (e.g., the speaker/microphone 724 of FIG. 7) to detect and/or receive the audio data. In some embodiments, the audio data may be an analog signal corresponding to the voice input spoken by the user. In some embodiments, the voice input module 202 may include an analog-to-digital converter for converting the analog signal to a digital signal. The voice input module 202 may process the received audio data. In some embodiments, the voice input module 202 includes a digital signal processor (DSP) (e.g., a DSP of the exemplary processor 718 of FIG. 7) for converting one or more signals from analog form to digital form (e.g., the audio data) and/or for other signal processing. The audio data may remain in or be converted to a form suitable for the particular circuitry processing the audio data.

An output of the voice input module 202 is provided to the recognition module 204. After receiving the output of the voice input module 202 (e.g., the processed and/or converted audio data), the recognition module 204 may generate and/or tune a speech profile of a user of, for example, the user device 208, in any suitable way. In some embodiments, the speech profile only corresponds to the user of the user device 208. The speech profile may include, for example, data of or related to one or more recognition parameters that, for example, are determined based on characteristics of a user's voice and/or speech, data related to customization information provided by the user, for example, as a result of interactions (e.g., previous interactions) between the user and the user device 208, data of or related to any other characteristic associated with the user, and/or any other data or parameters.

After the speech profile is generated and/or tuned, for example, by the recognition module 204, the speech profile may be stored, for example, in the speech profile storage 206. The recognition module 204 may access information from and/or store data in any type of suitable memory, for example, the speech profile storage 206. In some embodiments, the speech profile storage 206 may include non-removable memory (e.g., non-removable memory 730 of FIG. 7) and/or may include removable memory (e.g., removable memory 732 of FIG. 7). In some embodiments, alternatively or in addition to those embodiments of the speech profile storage 206 described, the speech profile storage 206 may be cloud-based storage (e.g., the remote storage/cloud 118 of FIG. 1).

In some embodiments, the speech profile may include a vocal model of a corresponding user's voice. The vocal model, for example, may be data that represents characteristics of a particular user's voice and/or speech pattern, among other information. The vocal model may, for example, be adjusted to improve recognition accuracy and decrease recognition errors, for example, of the user's voice via the recognition module 204. For example, the recognition module 204 may be configured to adapt to characteristics of a particular user's voice or speech pattern by adjusting one or more parameters associated with one or more recognition algorithms associated with the recognition module 204.

In some embodiments, the customization information that may be included in the speech profile may include information corresponding to one or more customized labels (e.g., customized vocabulary) assigned by the user associated with the speech profile (e.g., customized names given to particular words or phrases by the user). The recognition module 204 may be configured to determine and/or recognize labels given (e.g., by the user) to, for example, playlist names (e.g., a music playlist labeled "jazz"). For example, as a result of this configuration of the recognition module 204, after the user provides a speech-based instruction (e.g., "Play my jazz playlist") to, for example, the voice input/output module 202, the recognition module 204 may recognize the label "jazz" given by the user to a particular playlist including jazz music and may execute the speech-based instruction based on the label. These customized labels may be part of a particular user's speech profile.

In some embodiments, the customization information includes information corresponding to one or more customized pronunciations of one or more particular words and/or phrases. In some embodiments, the customized pronunciations are defined, updated, and/or deleted, for example, by input from the user (e.g., via the speaker/microphone 624, the keypad 626, and/or the display/touchpad 628). For example, the customization information may include information corresponding to a customized pronunciation of the name of the basketball player "Manu Ginóbili" as "Mah-new Ji-no-blee"; a pronunciation of the name "Manu Ginóbili" by, for example, an output interface of a user device without customized pronunciations, may be "Man-ew Gee-no-beel-ee." This pronunciation (or mispronunciation) may decrease the user's satisfaction of, for example, the user device 208.

In some embodiments, the customization information includes information corresponding to one or more customized relationship mappings. For example, the one or more customized relationship mappings may be an association (e.g., defined by the user) of content (e.g., content stored on and/or accessible by, for example, the user device 208) associated with particular words and/or phrases with other words and/or phrases. The recognition module 204, for example, may be configured to generate and/or recognize relationships associated with the user. For example, the recognition module 204, via the user, may be provided with relationship information, such as, familial relations (e.g., "Rebecca is my wife," "Bob is my father"), location information (e.g., an address of the user's doctor's office) and/or any other information, and/or the recognition module 204 may generate a customized mapping of the particular relationship information (e.g., a customized mapping between input vocabulary "wife" and "Rebecca" with the associated user). In some embodiments, as a result of this configuration of the recognition module 204, for example, after the user provides the relationship information, the user may be able to provide a speech-based instruction (e.g., "Text my wife that I'm running late") via the system 200 and/or one or more components of the system 200 may execute an action associated with the speech-based instruction and/or based on the relationship information. The customized relationship information may be part of a particular user's speech profile.

Figure 3A:
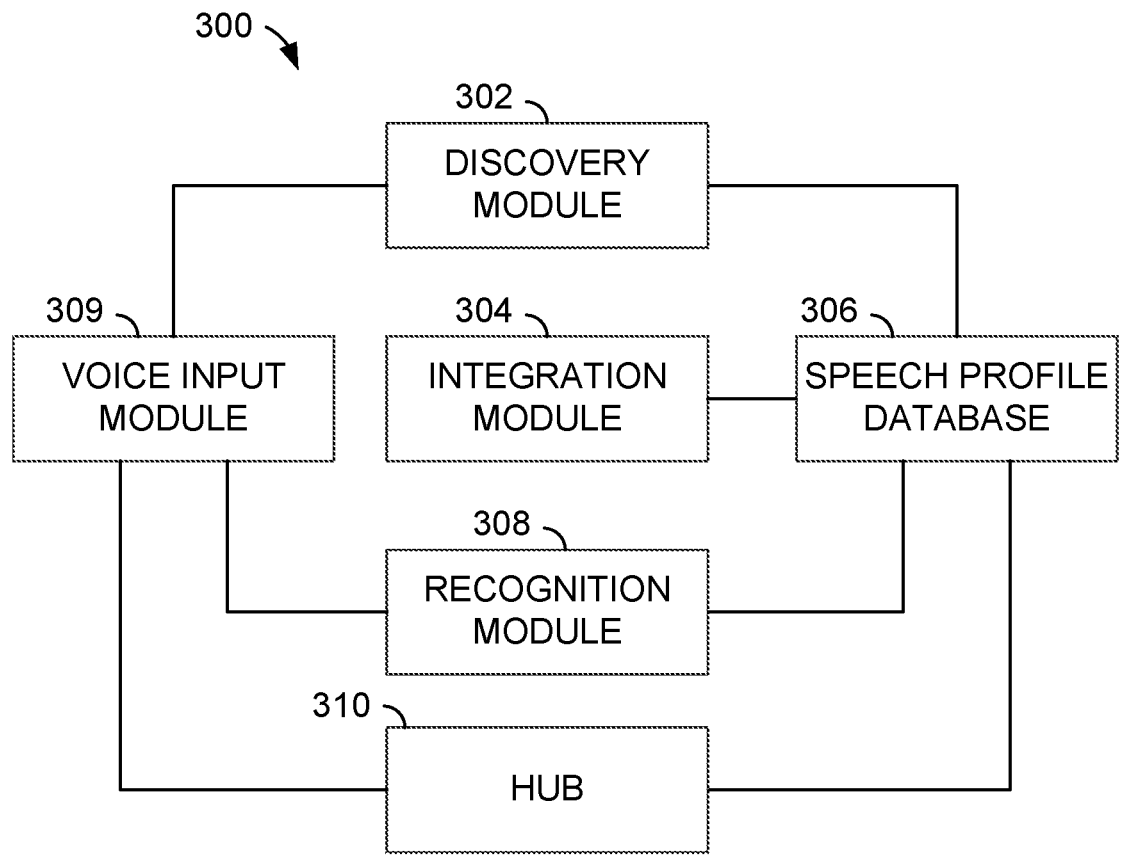
FIG. 3A is a block diagram of an example system for integrating a speech profile into a multi-user device and/or for determining a speaker identity in accordance with some embodiments.

FIG. 3A illustrates a block diagram of an example system 300 for integrating a speech profile (e.g., the speech profile generated and/or tuned by the recognition module 204 of FIG. 2), for example, into a multi-user device (e.g., the hub 108 of FIG. 1) and/or determining a speaker identity (e.g., of a user of the hub 108).

The system 300 may include a discovery module 302, an integration module 304, a speech profile database 306, a recognition module 308 which may include a recognition engine 318, a voice input module 309, and a hub 310. Although the hub 310 is depicted as a separate component in FIG. 3A from the discovery module 302, the integration module 304, the speech profile database 306, and the recognition module 308, it will be appreciated that one or more of the discovery module 302, the integration module 304, the speech profile database 306, and the recognition module 308 may be totally or partially embedded in and/or may be coupled to the hub 310 in any suitable combination and/or sub-combination.

The discovery module 302 may be configured to discover a user device (e.g., having wireless communication capabilities and/or associated with a user having a speech profile), for example, wirelessly (e.g., by transmitting and/or receiving wireless communication signals, such as, for example, radio frequency (RF)). In some embodiments, for example, the user device that may be discovered and/or discoverable may include the user device 102 and/or the controllable devices and/or services 112, 114, 116. The network discovery module 302 may include any suitable combination of hardware, software, and/or firmware that allows for the discovery (e.g., the wireless discovery) of the user device. In some embodiments, for example, the discovery module 302 may include at least any suitable number of transceivers and/or transmit/receive elements (e.g., any suitable number of the transceiver 720 and/or the transmit/receive element 722, both of FIG. 7). In some embodiments, the discovery module 302 and the user device may communicate (e.g., wirelessly) via a discovery protocol, such as, for example, Bluetooth® low energy (also known as Bluetooth® LE and/or Bluetooth Smart®) and/or Bonjour/Zeroconf. It should be understood that, in some embodiments, the discovery module 302 and the user device may wirelessly communicate via any suitable discovery protocol known or in existence now or at a later time. In some embodiments, the discovery module 302 may be configured to discover the user device when the user device is within a proximity range (e.g., within a predetermined range of distances, for example, that may be based on a broadcast range associated with the particular discovery protocol used) with respect to, for example, the discovery module 302 and/or other components of the system 300 (e.g., the hub 310). For example, the user device may be transported (e.g., by a user of the user device) from a location outside of the proximity range to a location within the proximity range, and as a result of the user device being within the proximity range, the discovery module 302 may discover the user device. For example, in some embodiments, to discover the user device, the discovery module 302 may transmit and/or receive one or more inquiry/response signals with the user device, may exchange packets of information (e.g., packets of information including address information, clock information, and/or other information) with each other, and/or may establish and/or maintain a connection with the user device, for example, based on the exchanged packets of information. In some embodiments, the user device may be discovered when the user device is located within the proximity range, for example, for at least a threshold amount of time. In some embodiments, the user device may be discovered even if the user of the user device has not previously interacted with the system 300 (e.g., the speech-based UI of the hub 310). Any suitable number of user devices may be discovered via the system 300.

Alternatively, in some embodiments, association of a user's user device with the hub 310 may be accomplished through an explicit registration process. As an example, in a household, Apple IDs associated with all of the family members of the household may be added to the home's hub. In this example, the home's hub may then request the speech profile of each family member and/or may integrate the speech profiles (e.g., even if each family member's user device is not physically present). Features such as Family Sharing (e.g., a mechanism through which multiple Apple IDs may be denoted as being members of the same family) may be used to simplify this process.

In some embodiments, after the user device is discovered, an indication related to integration of a speech profile associated with the user of the discovered user device may be generated by or communicated to, for example, the user device and/or the hub 310. In some embodiments, the indication may be any suitable way of representing that the speech profile of the user of the discovered user device may be integrated, for example, absent a response by the user and/or the one or more of the users of the hub 310. For example, in some embodiments, the indication may be an audio output (e.g., a sound output from a speaker, such as, the example speaker/microphone 724 or speaker(s) 906) and/or a visual output (e.g., a light output from a light source that may be switched "on" and "off" any number of times, such as visual indicator(s) 908, and/or a message displayed on a display, such as, the example display/touchpad 728).

In some embodiments, the indication may prompt the one or more users of the hub 310 and/or the respective users of the user devices for a response (e.g., a user input, such as, a speech-based response, a push of a button, and/or a movement of an object or body part) to allow or disallow integration of a speech profile associated with the user of the discovered user device. The hub 310 may communicate an indication that prompts, for example, via an audio output, the users of the hub and/or one or more particular users of the hub (e.g., one or more users of user devices discovered by the hub 310 within a certain time period). In addition to or alternatively to the indication that may be communicated by the hub 310, in some embodiments, the user device may display an indication, asking its user whether the user approves transmission of the user's speech profile to the hub 310. This request for permission may serve as a protection against potential privacy risks.

In some embodiments, the discovery module 302 may request a speech profile from a discovered user device by transmitting a speaker-profile-data inquiry. In an example, a determination may be made as to whether a speech profile is already stored in and/or otherwise accessible to the system 300. The determination may be made in response to the discovery module 302 discovering a user device and/or may be made before a speaker-profile-data inquiry is transmitted to the discovered user device. For example, the system 300 may not send a speaker-profile-data inquiry to a discovered user device if the system 300 determines that the system 300 previously received a speech profile from the discovered user device or that a threshold amount of time has not been exceeded since the system 300 previously received a speech profile from the discovered user device. The system 300 may send a speaker-profile-data inquiry to a discovered user device if the system 300 determines that the system 300 did not receive a speech profile from the discovered user device or that a threshold amount of time has been exceeded since the system 300 previously received a speech profile from the discovered user device.

The integration module 304 is configured to integrate one or more speech profiles into operation of the system 300 (e.g., storing the one or more speech profiles, executing instructions by/after processing data in the one or more speech profiles). For example, the integration module 304 may receive the extracted speech profile with user-specific customizations/parameters from the user device and/or may update/augment the recognition engine 318 of the recognition module 308 with the received speech profile. Output from the integration module 304 may include data included in the speech profile and/or the output may be provided by the integration module 304 in any suitable form to the other components of the system 300. In some embodiments, after being discovered (e.g., by the discovery module 302), the user device may transmit the speech profile associated with the user of the discovered user device (e.g., generated and/or tuned via the recognition module 204) to the integration module 304. For example, the speech profiles that may be integrated by the integration module 304 may be previously generated and refined via the individual user's user device (e.g., through the use of speech agents such as Siri® or Google Now®). In some embodiments, after receiving the speech profile, the integration module 304 may integrate the speech profile (e.g., into the speech profile database 306 and/or the speech recognition module 308) in such a way that the speech profile is accessible by one or more components of the system 300, for example, when performing speech related operations.

In some embodiments, to integrate the speech profile of the user of the discovered user device, the integration module 304 may define a new user (e.g., a new user of the hub 310) by executing an operation based on certain conditions, for example, related to the speech profile. For example, in some embodiments, after the speech profile of the user of the discovered user device is received, the integration module 304 may be configured to determine if that speech profile was received via a user device that had not been previously discovered by one or more components of the system 300 (e.g., by the discovery module 302). For example, the integration module 304 may communicate with the hub 310 and/or the discovery module 302 to obtain data corresponding to previously discovered user devices. In some embodiments, for example, if the discovered user device had not been previously discovered, the integration module 304 may define the user of the not-previously-discovered user device as a new user (e.g., may define that user as a new user of the hub 310) and/or may associate the speech profile received from that user device as the speech profile of the new user. As another example, in some embodiments, the integration module 304 may define a new user when the speech profile of the user of the discovered user device is received via a discovered user device not having been discovered by the discovery module 302 for a predetermined threshold of time (e.g., defines a new user of the hub 310 if the discovered device had not been discovered in, for example, two months). In some embodiments, for example, to integrate the speech profile of the user of the discovered user device, data corresponding to the speech profile is stored in the database 306. Any suitable number of the database 306 may be included in the system 300 and/or the database 306 may include any suitable number of databases in any suitable combination any/or sub-combination. In some embodiments, the database 306 may be implemented in cloud-based storage (e.g., cloud storage 118).

Figure 3B:
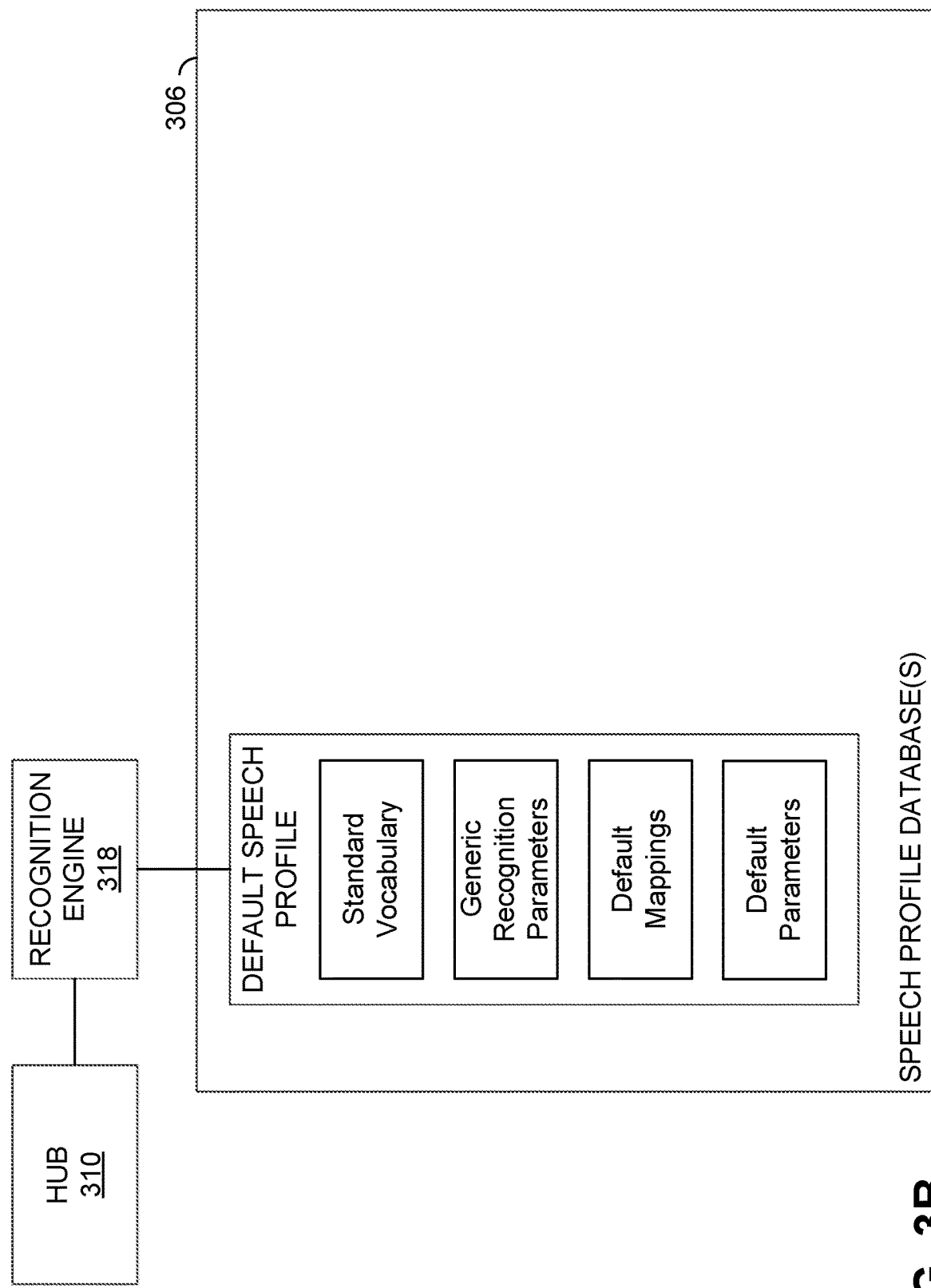
FIG. 3B is a block diagram of an example system for integrating a speech profile into a multi-user device and/or for determining a speaker identity in accordance with some embodiments.

FIG. 3B is a block diagram of an example system for integrating a speech profile into a multi-user device and/or for determining a speaker identity in accordance with some embodiments. The exemplary configuration illustrated in FIG. 3B may be a default home hub recognizer configuration, which may be a configuration in which the hub 310 stores or has access to a default speech profile, but does not store or have access to user-specific speech profiles. As shown in FIG. 3B, a speech profile database includes a default speech profile. The default speech profile may include a default data set of default customizations (e.g., customizations not customized by the user of the device), default recognition (e.g., voice and/or speech recognition) parameters, default mappings, other parameters, other data, and/or the like. In some embodiments, the default set of data associated with the default speech profile included in the speech profile database 306 may be determined and/or selected by, for example, a manufacturer of the hub 310.

Figure 3C:
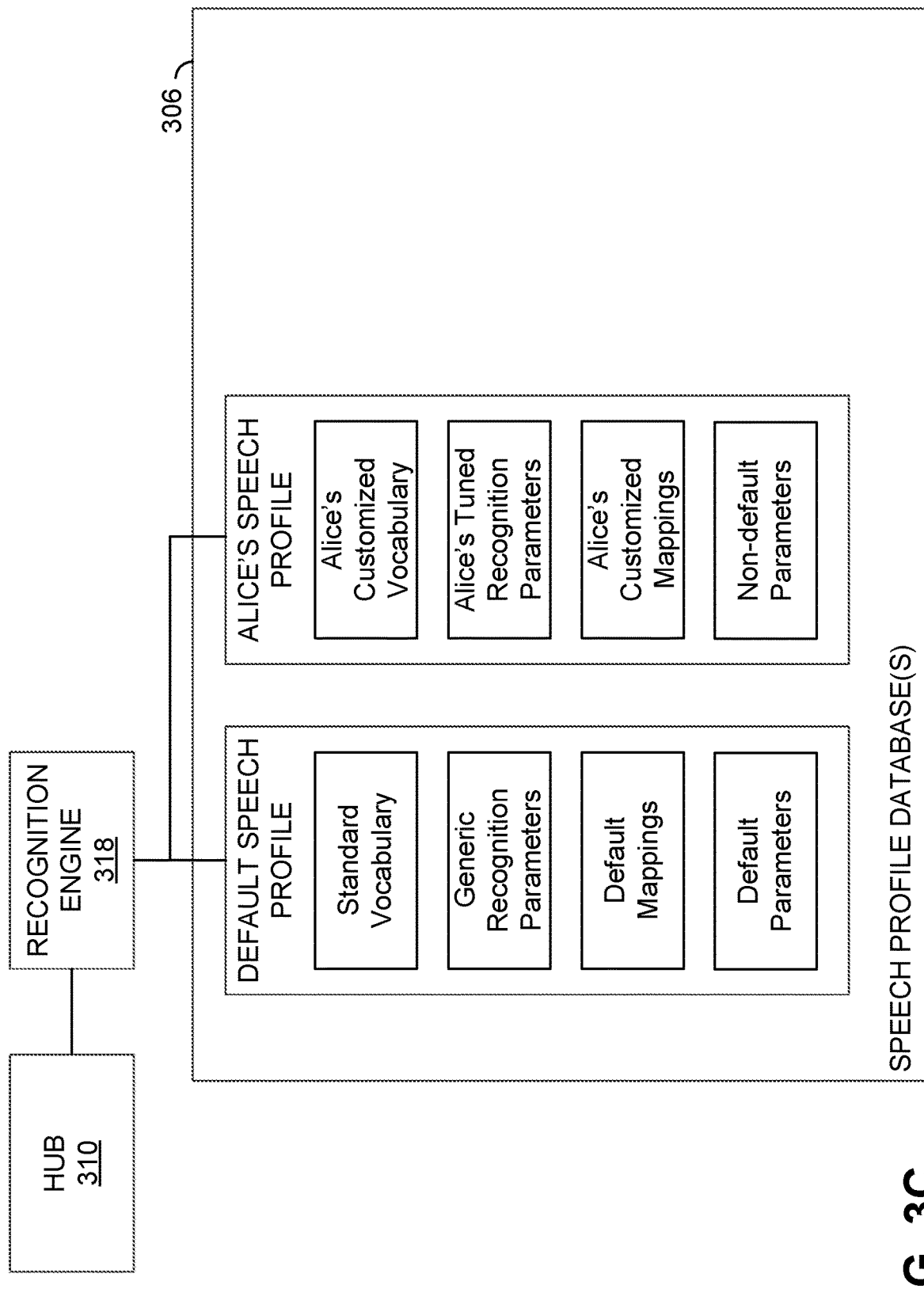
FIG. 3C is a block diagram of an example system for integrating a speech profile into a multi-user device and/or for determining a speaker identity in accordance with some embodiments.

FIG. 3C is a block diagram of an example system for integrating a speech profile into a multi-user device and/or for determining a speaker identity in accordance with some embodiments. The exemplary configuration illustrated in FIG. 3C may be of a home hub recognizer after loading a profile of a first user ("Alice"). As shown in FIG. 3C the speech profile database includes a first tuned speech profile (e.g., a speech profile that was tuned on a user device prior to being transmitted to the discovery module 302 and/or the integration module 304) received from a user device of the first user. In some embodiments, for example, the first tuned speech profile included in the database may include a set of data generated as a result of use of the first user device by the first user, for example, prior to the first user device being discovered. The first tuned speech profile may include, for example, first-user customizations, first-user voice and/or speech recognition parameters, first-user mappings, other first-user parameters, other first-user data and/or the like.

Figure 3D:
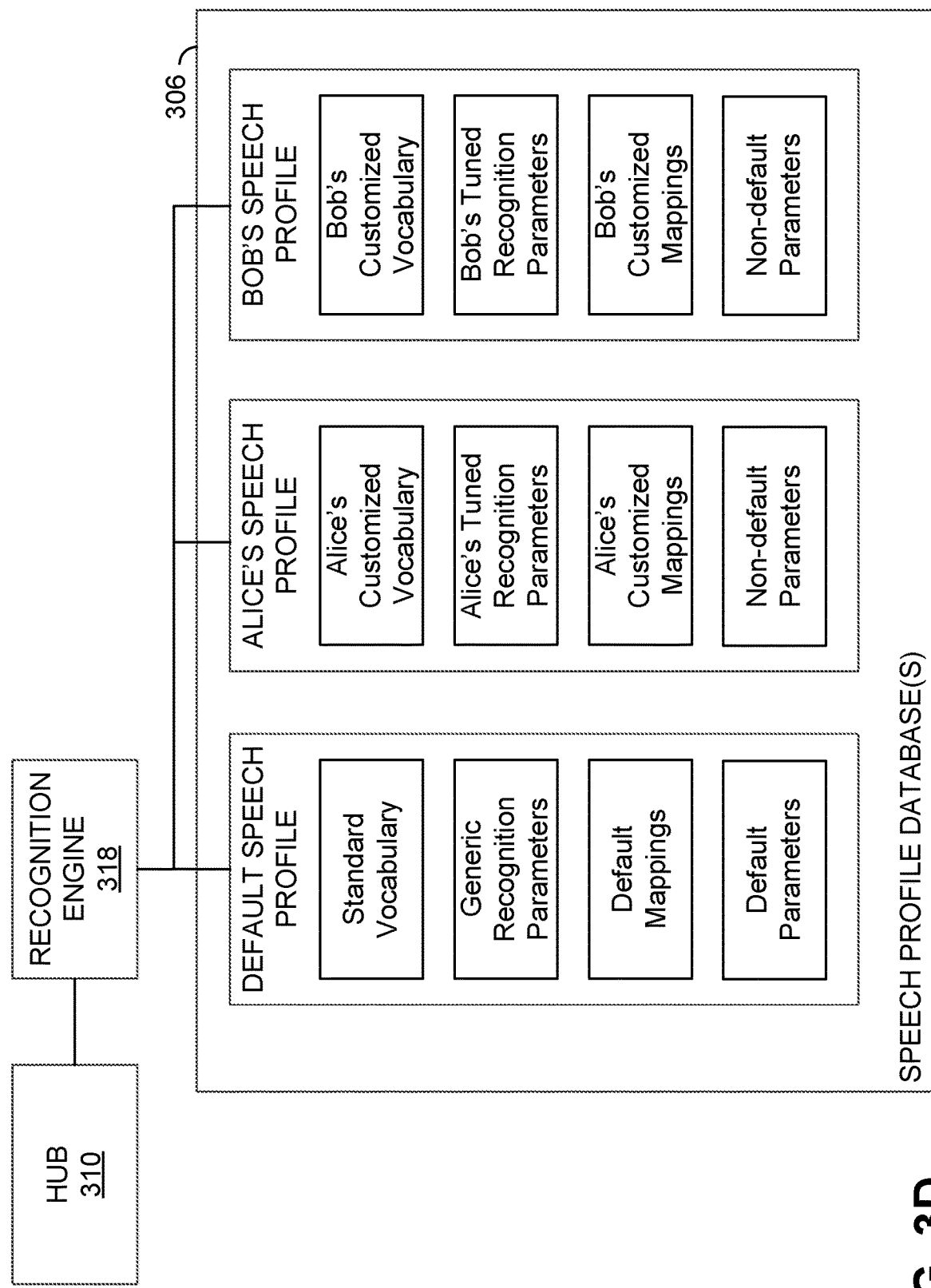
FIG. 3D is a block diagram of an example system for integrating a speech profile into a multi-user device and/or for determining a speaker identity in accordance with some embodiments.

FIG. 3D is a block diagram of an example system for integrating a speech profile into a multi-user device and/or for determining a speaker identity in accordance with some embodiments. The exemplary configuration illustrated in FIG. 3D may be of a home hub recognizer after additionally loading a profile of a second user ("Bob"). As shown in FIG. 3D, speech profile database includes a second tuned speech profile of a second user of a second user device. In some embodiments, for example, the second tuned speech profile included in the database 306 may include a set of data generated as a result of use of the second user device by the second user, for example, prior to the second user device being discovered. The second tuned speech profile may include, for example, second-user customizations, second-user voice and/or speech recognition parameters, second-user mappings, other second-user parameters, other second-user data and/or the like.

In some embodiments, to integrate the speech profile of the corresponding user (e.g., a new user, the first user, or the second user) of the discovered user device, the integration module 304 may be configured to incorporate customization information (e.g., customized labels, customized pronunciations) of the user into the working vocabulary of the system 300 (e.g., the working vocabulary of the recognition module 308). For example, the integration module 304 may incorporate the specialized names, terms, pronunciations, etc. that may be included in the speech profile of the user into the working vocabulary of the system 300.

In some embodiments to integrate the speech profile of the user of the discovered user device, the integration module 304 may be configured to update relationship mappings defined in the system 300 (e.g., defined in the recognition module 308) based on customization information (e.g., customized relationship mapping information). For example, the relationship mappings of the recognition module may be updated so that certain words and phrases (e.g., words and phrases, such as, "wife," "husband," "my home," "my work") are mapped to the information (e.g., contact information, work information, family information, other information) associated with those words and/or phrases as defined in the speech profile of the user.

In some embodiments to integrate the speech profile of the user of the discovered user device, recognition parameters (e.g., a voice model) included in the speech profile of the user may be incorporated into the one or more speech recognition algorithms included in the system 300 (e.g., the recognition module 308) for determining and/or recognizing speech.

In some embodiments, for householders (those who live in the home), their respective speech profile may, for example, reside permanently in the hub 310 and/or may be updated periodically, if and/or when, the profile is refined on the user's user device. In some embodiments, for visitors, the profile may be integrated into the hub only temporarily and may be dissociated from the hub once the visitor's mobile phone is no longer discoverable.

The recognition module 308, in some embodiments, may include any suitable combination of hardware, software, and/or firmware that operate to recognize and/or determine a speaker identity (e.g., an identity of a user that may be interacting, for example, currently with the hub 310 by speaking) from a plurality of speaker identities. In some embodiments, one or more of the plurality of speaker identities may correspond to a user associated with a discovered user device, the user not having previously interacted with the hub 310 by speaking. The recognition module 308 may be configured to receive speech profile data (e.g., from the integration module 304), receive audio data (e.g., audio data of speech), execute one or more recognition algorithms (e.g., speech recognition algorithms), for example, for recognizing and/or determining the speaker identity from the plurality of speaker identities. In some embodiments, the recognition module 308 may receive audio data, for example, voice input spoken by a user (e.g., a user of the hub 310) and/or may be provided with audio data, for example, from the hub 310. In some embodiments, the recognition module 308 may detect and/or receive the voice input spoken by the user. For example, the recognition module may include a microphone (e.g., the speaker/microphone 724 of FIG. 7) or other audio circuitry/devices to detect and/or receive the audio data. In some embodiments, the audio data may be an analog signal corresponding to the voice input spoken by the user. In some embodiments, the recognition module 308 may include an analog-to-digital converter for converting the analog signal to a digital signal. The recognition module 308 may process the received audio data. In some embodiments, the recognition module includes a digital signal processor (DSP) (e.g., a DSP of the exemplary processor 718 of FIG. 7) for example, for converting one or more signals from analog form to digital form (e.g., the audio data) and/or for other and/or additional signal processing. The audio data may remain in or be converted to a form suitable for the particular circuitry processing the audio data.

Figure 4:
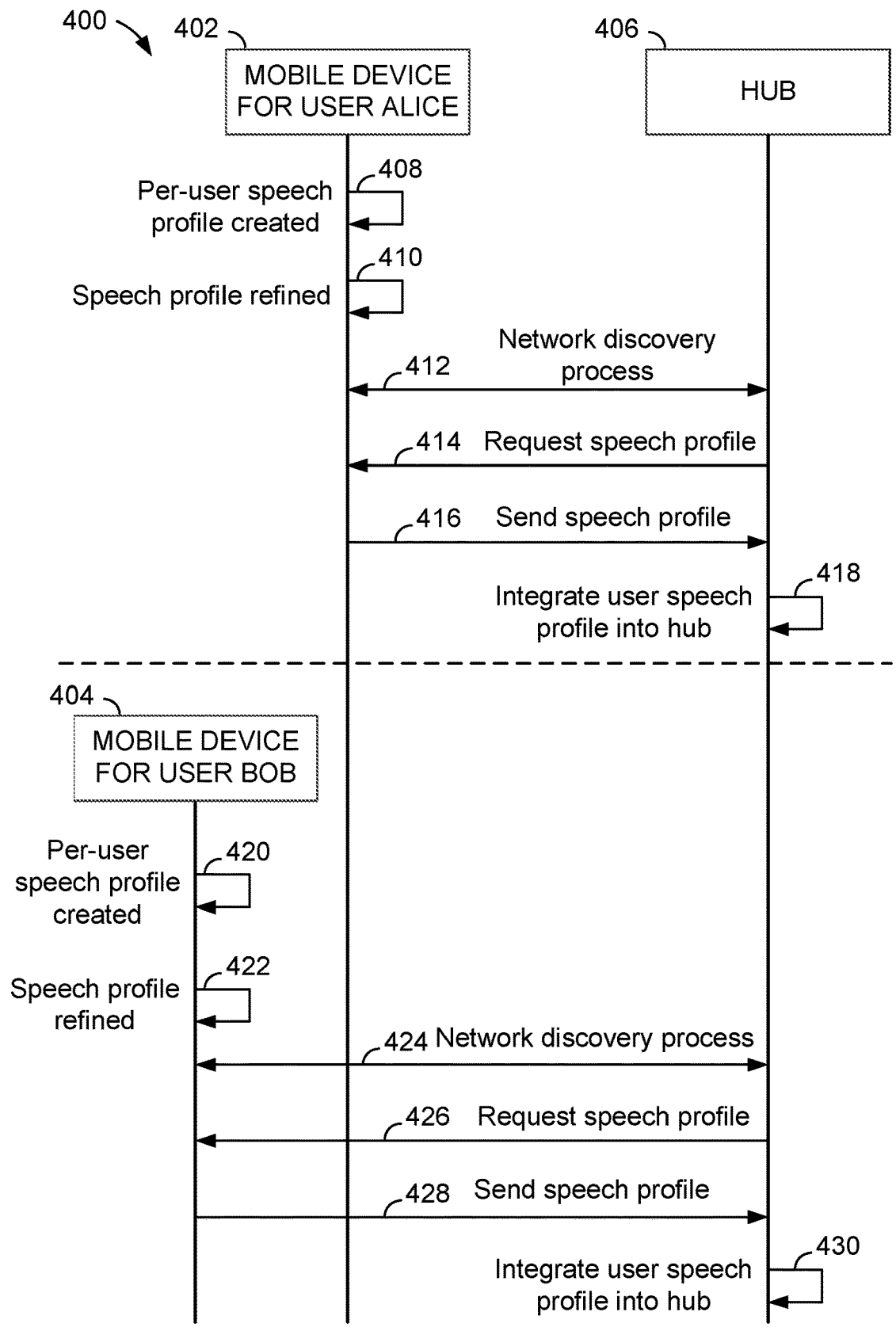
FIG. 4 is a flow diagram of an example data flow and/or data processing for user device discovery and/or speech profile integration in accordance with some embodiments.

FIG. 4 is a flow diagram illustrating data flow and data processing 400 for discovery of one or more user devices and/or for integration of one or more speech profiles of a corresponding user of the discovered user device in accordance with some embodiments. Illustrated in FIG. 4 are example user device 402, which is associated with user "Alice" in this example flow diagram, example user device 404, which is associated with user "Bob" in this example flow diagram, and hub 406 (e.g., the example hub 108, the example hub 308). In some embodiments, for example, a default speech profile may be integrated into the hub 406.

In some embodiments, steps 408 and/or 410 may be carried out prior to discovery of the user device 402 and/or prior to integration of the speech profile corresponding to the user of the user device 402. In step 408, a speech profile is generated, for example, for the user Alice of the user device 402 by the user device 402. In step 410, Alice's speech profile is refined and/or tuned, for example, over time through repeated interactions between Alice and the user device 402.

In step 412, after this generating and/or tuning of, for example, Alice's speech profile, the hub 406 discovers the user device 402 via a network discovery process.

In an example, a determination may be made as to whether a speech profile is already stored in and/or otherwise accessible to the hub 406. The determination may be made in response to discovering a user device (e.g., after or during the network discovery process and/or before a speaker-profile-data inquiry is transmitted to a discovered user device). For example, in response to discovering the user device 402, the hub 406 may determine whether the hub 406 has already received a speech profile from the discovered user device 402. In response to such a determination, the hub 406 may not transmit a speaker-profile-data inquiry to the discovered user device 402. If the hub 406 determines that the hub 406 has not received a speech profile from the discovered user device 402, the hub 406 may transmit a speaker-profile data inquiry to the user discovered device 402.

In step 414, after discovering the user device 402, the hub 406 requests Alice's speech profile from the user device 402 by sending a speaker-profile-data inquiry. In some embodiments, Alice is prompted on the user device 402 for a confirmation input to permit transmission of Alice's speech profile to the hub 406 and/or to permit integration of Alice's speech profile into the hub 406. In other embodiments, the hub 406 automatically retrieves and integrates Alice's speech profile from the user device 402 without a confirmation input from Alice.

In step 416, the user device 402 transmits Alice's speech profile to the hub 406 (e.g., after the confirmation input).

In step 418, after receiving Alice's speech profile, the hub 406 integrates Alice's speech profile into its operations and/or storage. After integration of Alice's speech profile, the hub 406 may have sets of data storing the default speech profile and Alice's speech profile.

In some embodiments, one or more additional user devices may be discovered and/or one or more additional speech profiles associated with those user devices may be integrated, for example, into the hub 406.

Steps 420, 422, 424, 426, 428, and/or 430 may be carried out in the same or similar manner as described above in steps 408, 410, 412, 414, 416 and/or 418, receptively. In this instance of the example flow diagram of FIG. 4, the steps may be carried out with respect to Bob's speech profile and/or the user device used by Bob. In this instance, for example, Alice's speech profile may already be integrated into the hub 406 and/or after integration of Bob's speech profile, the hub 406 may have databases associated with the default speech profile, Alice's speech profile and/or Bob's speech profile.

Figure 5:
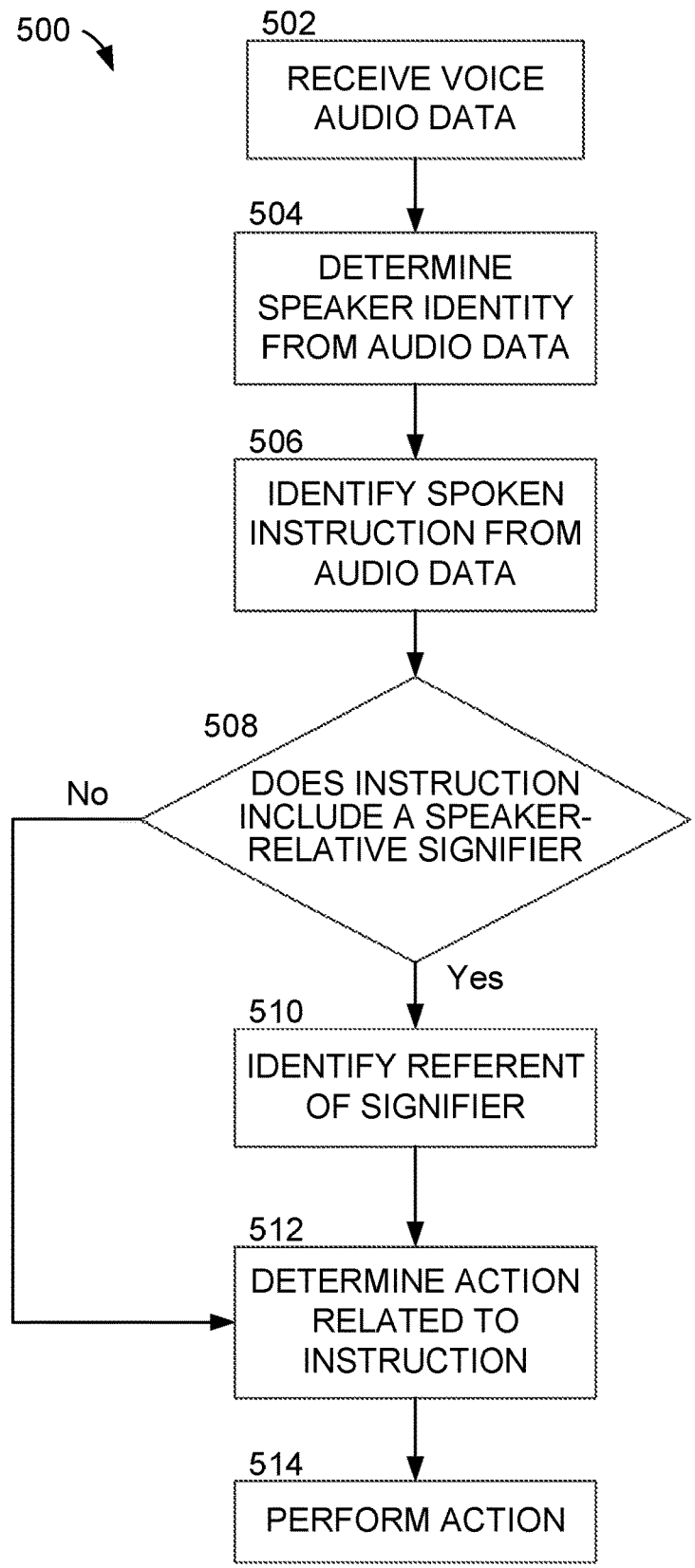
FIG. 5 is a flow chart of an example method for speech-based recognition of one or more users of a multi-user device and/or speech-based control of the multi-user device in accordance with some embodiments.

FIG. 5 is a flow chart illustrating an exemplary method 500 for speech-based recognition of at least one of multiple users of a multi-user device and/or speech-based control of the multi-user device in accordance with some embodiments. In some embodiments, the method 500 is carried out after integration of speech profiles associated with the multiple users into the multi-user device.

In step 502, voice audio data of a user of a multi-user device is received, for example, by a multi-user device (e.g., the hub 108 and/or the hub 310). The audio data may be provided by the user of the multi-user device, who may interact with the multi-user device by speaking via a speech-based UI associated with the multi-user device. In some embodiments, the user of the multi-user device may have previously interacted with the multi-user device. In some other embodiments, the user of the multi-user device may have not previously interacted with the multi-user device.

In step 504, a speaker identity (e.g., a speaker identity corresponding to a current speaker, for example, interacting with the multi-user device) is determined from among a plurality of speaker identities (e.g., determined by the multi-user device), for example, based on characteristics of the received audio data. This determining of the current speaker identity, for example, may be carried out by the multi-user device, the cloud, or other suitable mechanism. In some embodiments, the speaker identity is determined from the plurality of speaker identities by comparing the characteristics of the received audio data to the speech profiles (e.g., to the data sets of the speech profiles). In some embodiments, the current speaker identity is determined by processing the received audio data, (e.g., through the recognition algorithm), which may, for example, include: (a) tuning the recognition algorithm with the recognition parameters that may be included in each of the speech profiles (e.g., tuning the recognition algorithm with each profile's parameters sequentially), (b) generating a confidence value (e.g., based on the tuning of the recognition algorithm) for each of at least one of the speech profiles, the confidence value of each speech profile, for example, being indicative of a reliability of correct recognition of the received audio data by the recognition algorithm when tuned with the recognition parameters of the respective speech profile, and/or (c) selecting the speaker identity based on the confidence value of at least one the speech profiles. The confidence value may be generated, and/or the speaker identity may be selected based on the confidence value. For example, in some embodiments, the speaker identity associated with the speech profile having the highest confidence value as compared to one or more of the generated confidence values (e.g., the speech profile having the confidence value indicative of the highest probability of accurately recognizing the received audio data as compared to the other generated confidence values) may be selected. In some embodiments, the speaker identity associated with the speech profile having a confidence value that exceeds a threshold may be selected. The determining of the speaker identity may be accomplished in alternative ways, such as, for example, collecting vocal signatures on the user's user device which could be used to disambiguate who among the loaded users' profile is speaking. For example, the vocal signature may be unique (e.g., highly unique) to the user's vocal patterns. When multiple users' profiles are loaded, for example, into the hub 108 and/or the hub 308, a distance comparison (e.g., using the Mahalanobis distance function) may be used to determine which signature is closest to the current utterance (e.g., received audio data) in order to identify the speaker.

In step 506, an instruction is identified from the received audio data. The identification of the instruction in step 506 may be carried out by the multi-user device, the cloud, or any other suitable mechanism. In some embodiments, after the current speaker identity is determined (e.g., via step 504), the instruction may be identified by interpreting the instruction in the context of the speech profile associated with the current speaker identity. This interpreting of the instruction may be accomplished by parsing the instruction in view of the customization information (e.g., customized labels/vocabulary, customized pronunciations, customized relationship mappings) that is associated with the speech profile of the current speaker identity.

An instruction may include a speaker-relative signifier, such as a word, phrase or other combination of phonemes that refers to different data depending on the identity of the speaker. For example, in the instruction "Call my wife," the phrase "my wife" is a speaker-relative signifier because it refers to different sets of contact information depending on the identity of the speaker. Similarly, in the instruction "Play my jazz playlist" or "Turn on lights in my bedroom," the term "my" is a speaker-relative signifier because it refers to different sets of playlists or different networked lighting systems depending on the identity of the speaker. Similarly, the signifiers "home" or "work" may refer to different data (e.g. different address data) depending on the identity of the speaker. In some embodiments, a list of commonly-used predetermined speaker-relative signifiers are stored in the profile of a respective user, for example in a table that associates speaker-relative signifiers to identifiers of other users. Examples of speaker-relative signifiers include "my wife", "my husband," "Mom," "Dad," "Grandma," "my brother," "my sister" and the like.

In step 508, a determination is made of whether the instruction includes a speaker-relative signifier. If the instruction is determined to include a speaker-relative signifier, the method 500 proceeds to step 510. In some embodiments, if the instruction is determined to not include any speaker-relative signifier, the method 500 may proceed to step 512.

In step 510, the system operates to identify the referent of the speaker-relative signifier. The referent may be the identity of another user or the identity of an individual in the user's contact list. The referent of the speaker-relative signifier may be identified by checking a table that is included with the profile data of the speaker. For example, if the command includes the speaker-relative signifier "my brother," the system may check the table to determine whether there is any identity associated with the signifier "my brother." If so, the system may replace the term "my brother" with the identity found in the table. In some embodiments, the referent of the signifier may be identified after the determining of the instruction (e.g., via step 506). In some embodiments, the referent of the signifier may be determined by interpreting the signifier in the context of the speech profile associated with the current speaker identity. For example, this interpreting of the signifier may be accomplished in view of the customization information (e.g., customized labels/vocabulary, customized pronunciations, customized relationship mappings) that is associated with the speech profile of the current speaker identity.

In step 512, an action associated with the instruction is identified. This action may be identified at least in part based on the current speaker identity. In step 514, the action associated with the instruction (e.g., the action determined via step 512) is performed.

Figure 6A:
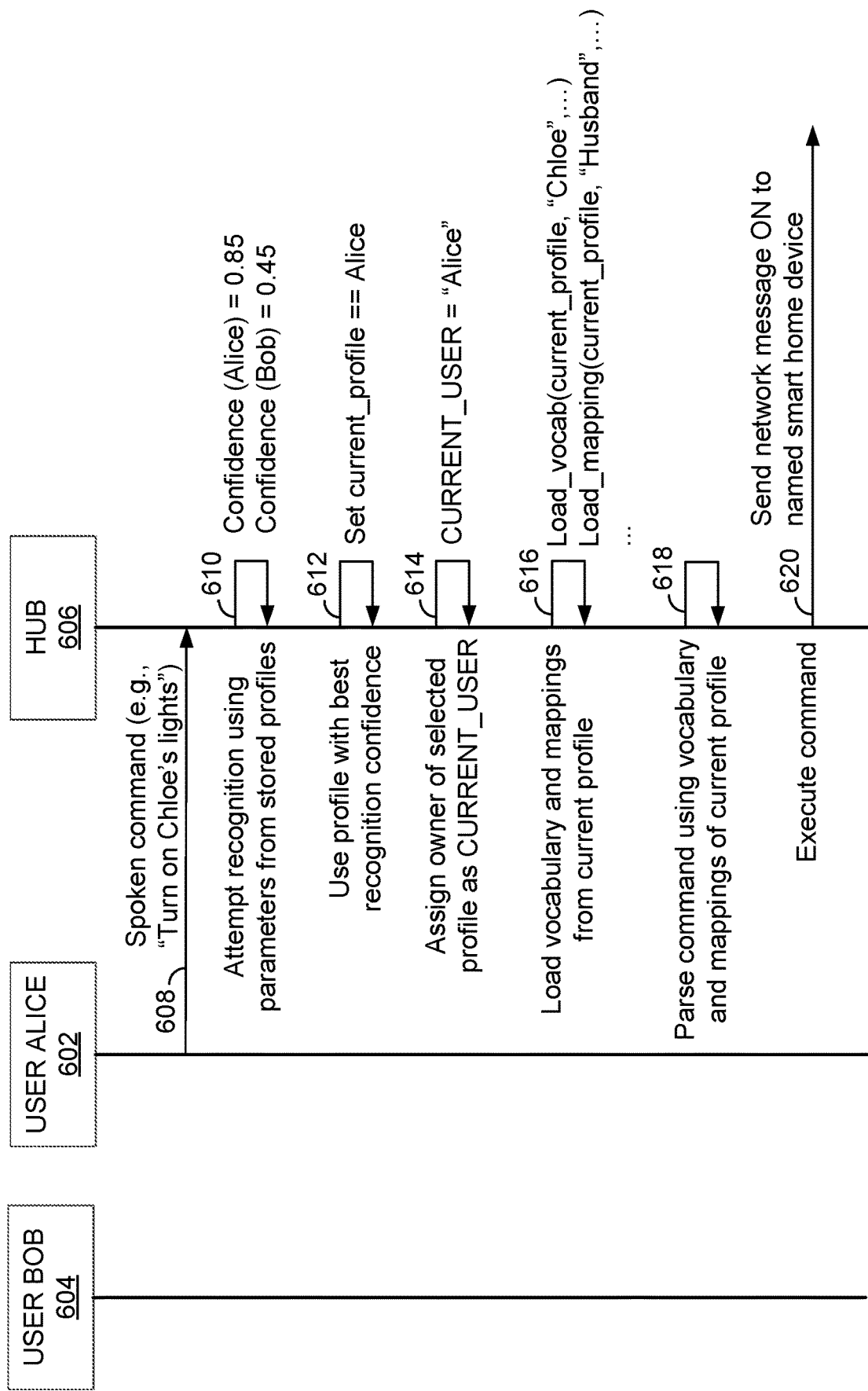
FIGS. 6A-6B is a flow diagram of an example data flow and/or data processing for speech-based recognition and/or control in accordance with some embodiments.
Figure 6B:
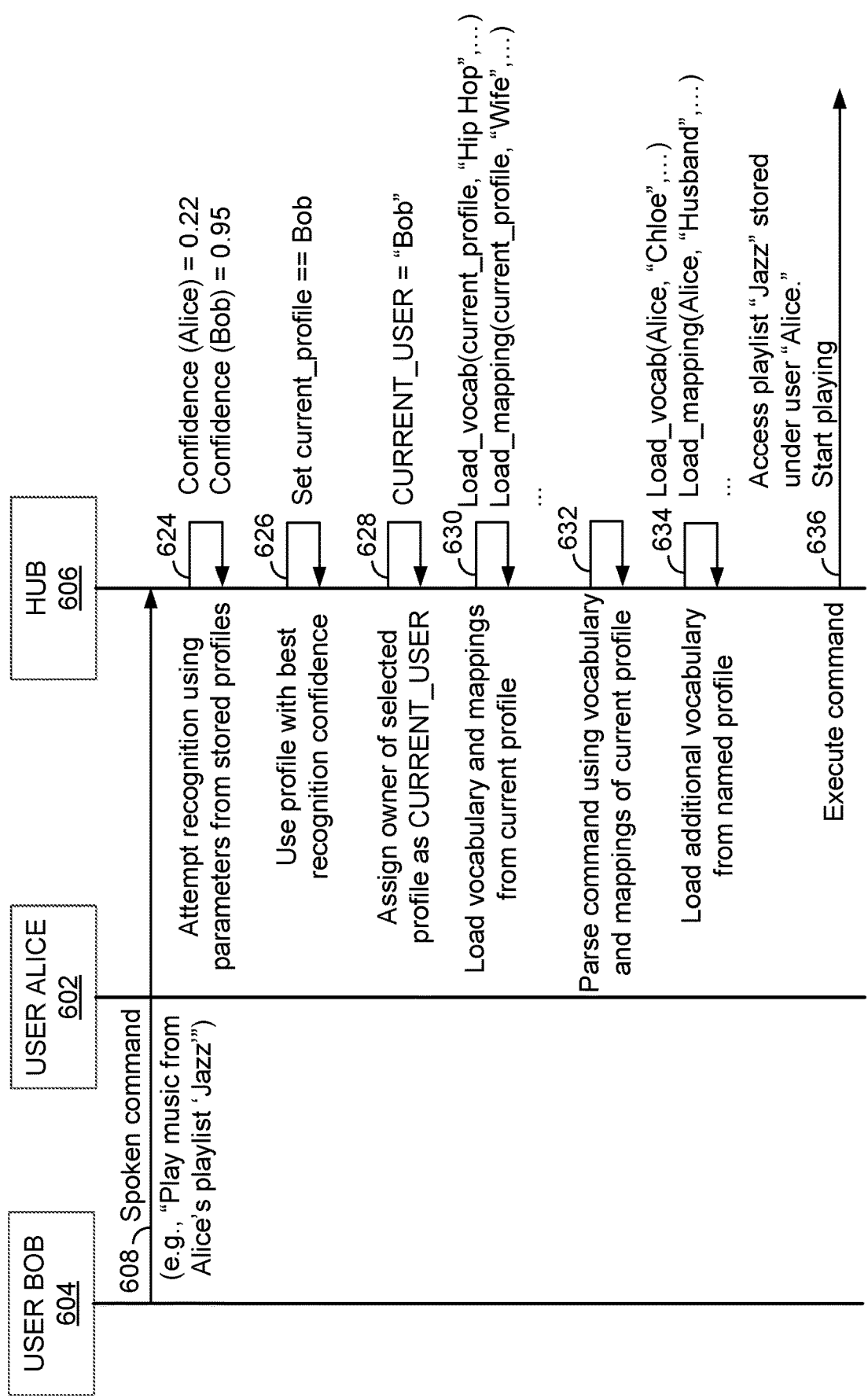

FIGS. 6A-6B is a flow diagram illustrating an example data flow and/or data processing 600 for speech-based recognition and control in accordance with some embodiments. Illustrated in FIGS. 6A-6B are example user 602 (having the name "Alice" in this example flow diagram), example user 604 (having the name "Bob" in this example flow diagram), and example hub 606 (e.g., the example hub 108, the example hub 308) on which speech profiles of Alice and Bob are stored.

In FIG. 6A, in step 608, the user 602 speaks an instruction (e.g., a command), such as, for example, "Turn on Chloe's lights," to the hub 606. The instruction may be communicated by the user 602 to the hub 606, for example, through a speech-based UI of the hub 606 and/or the instruction may be received by the hub 606. In this example, this instruction refers to a device via a name that is a part of Alice's specialized vocabulary (e.g., "Chloe's lights"), but that is not defined or mapped in the default vocabulary.

In step 610, after receiving the instruction, the hub 606 attempts recognition of the instruction with the recognition parameters associated with a corresponding one of the speech profiles and/or may generate a confidence value for each of the speech profiles based on the respective attempted recognition (e.g., based on an outcome of the recognition when employing the recognition parameters of the corresponding speech profile). To attempt recognition of the instruction with the recognition parameters associated with a corresponding one of the stored speech profiles, the hub 606 may retrieve the recognition parameters associated with a corresponding one of the stored speech profiles from a database including the corresponding speech profile and/or may tune the recognition algorithm with the recognition parameters that may be retrieved from the database including the corresponding speech profile. For example, as illustrated in FIG. 6A, the hub 606 may attempt recognition of the instruction with the recognition parameters associated with the speech profile of the user 602 (e.g., the recognition parameters of Alice's speech profile) and/or the hub 606 may generate a confidence value for the speech profile of the user 602 (e.g., a confidence value of 0.85 for Alice's speech profile) based on the respective attempted recognition. In some embodiments, after the attempting recognition of the instruction with the speech parameters associated with the speech profile of the user 602, the hub 606 may then attempt recognition of the instruction with the recognition parameters associated with speech profile of the user 604 (e.g., the recognition parameters of Bob's speech profile) and/or the hub 606 may generate a confidence value for the speech profile of the user 604 (e.g., a confidence value of 0.45 for Bob's speech profile) based on the respective attempted recognition. In the illustrated example, because Alice spoke the instruction to the hub 606, it follows that Alice's speech profile leads to a confidence value indicating a higher confidence of recognition than Bob's speech profile.

In step 612, the speech profile having the best recognition confidence (e.g., having the highest confidence value) may be set as the current profile. In the example illustrated in FIG. 6A, as a result of Alice's speech profile having a higher confidence value than Bob's speech profile, the current profile is set to Alice's speech profile.

In step 614, the user associated with the set current profile is assigned as the current user (current speaker). In the example illustrated in FIG. 6A, since the speech profile set as the current profile is associated with Alice, Alice is assigned as the current user.

In step 616, the hub 606 loads the customizations and/or other data from the current profile (e.g., any specialized vocabulary, referential mappings and/or other parameters from the current profile are loaded). For example, the hub 606 may load the vocabulary/labels and relationship mappings from Alice's profile which may have been previously customized by Alice (e.g., through interaction with the speech-based UI of her user device) for use with her user device and these customizations may also be available for Alice's use with the hub 606. Accordingly, terms that Alice is accustomed to using on her user device (e.g., names she uses for controllable devices/services (e.g., smart home devices), names of her playlists, an identity of her husband and/or information associated with her husband, where her work is located, etc.) are available for Alice's use when speaking with the hub 606.

In step 618, the hub 606 parses the instruction based on the loaded customizations and/or other data associated with the current profile. In other words, for example, the hub 606 may interpret the instruction within the context of this "local scope" of customized vocabulary, customized mappings and/or other data.

In step 620, after the hub 606 interprets the instruction within the local scope of the loaded customization and/or other data, the hub 606 executes the interpreted instruction (e.g. by performing an action associated with the instruction, or causing the action to be performed). For example, the hub 606 may send a message via the network to the controllable device/service named in the instruction directing the controllable device to perform an operation associated with the instruction. As illustrated in FIG. 6A, the hub 606 may send a message "ON" over the network to the controllable device/service associated with "Chloe's lights," as interpreted within the scope of Alice's speech profile, and as a result, the controllable device/service may turn on a light source.

In FIG. 6B, in step 622, the second user 604 may speak an instruction such as "Play music from Alice's playlist 'Jazz,'" to the hub 606. The instruction may be communicated by the user 604 to the hub 606, for example, through the speech-based UI of the hub 606 and/or the instruction may be received by the hub 606.

Steps 624, 626, 628, 630, and 632 may be carried out in the same or similar manner as steps 610, 612, 614, 616, and/or 618 as described above, respectively. In this instance illustrated in FIG. 6B, the user 604 is, for example, Bob, not Alice. As illustrated in FIG. 6B, because Bob provided the spoken instruction to the hub 606 on this occasion, the confidence value generated for Bob's speech profile represents a higher recognition confidence than Alice's speech profile. As a result of this, Bob's speech profile is set as the current profile, Bob is assigned as the current user, and/or the customizations and/or other data from Bob's speech profile are loaded.

In this instance illustrated in FIG. 6B, after the instruction is parsed based on the customizations and/or other data loaded from Bob's speech profile in example step 632, for example, in step 634, additional customizations and/or other data from Bob's speech profile may be loaded to execute the interpreted instruction. For example, Bob may not have a playlist named "Jazz" associated with his speech profile and/or accessible to, for example, the hub 606. In this instance illustrated in FIG. 6B, Bob's instruction includes a phrase referencing Alice's Jazz playlist. As a result of Alice's speech profile being accessible to the hub 606, her speech profile may be indirectly referenced and/or the mappings for this particular label (Jazz playlist) may be retrieved based on the mappings in Alice's speech profile (e.g., may be retrieved within the context of Alice's speech profile), for example, to execute the interpreted instruction.

In step 636, for example, after parsing Bob's instruction and/or loading Alice's profile to retrieve Alice's mappings associated with words and/or phrases in Bob's instruction, the hub 606 executes the interpreted instruction. For example, the hub 606 may access the playlist "Jazz" associated with Alice and begin playing that playlist.

Some desirable features that may result from the training process and/or personalized speech profiles may not be present in current multi-user devices/smart hub scenario. The algorithmic parameters adjusted by the speech-based UI are generally not available in current multi-user devices. Further, because, generally, the hub may be used by multiple users (e.g., multiple users communicating vocally with the hub) and it is likely that the users will have different vocal characteristics (speech profiles, vocal models) with respect to each other, current multi-user devices are generally not able to refine and fine-tune a set of parameterizations that work for each user. Additionally, because the voice characteristics of the users may be quite different, there may be no single set of parameters that improves recognition for all the users of the hub/system.

The systems and methods disclosed herein may be used to improve recognition rates and lower recognition errors of, for example, multi-user speech devices (e.g., shared hubs). For example, instead of attempting to determine a "one size fits all" parameterization of the hub's recognition algorithm, the systems and/or methods disclosed may allow multi-user speech devices to leverage a similar and/or the same level of recognition algorithm adaptation (e.g., training) possible in single-user speech device scenarios. Moreover, rather than explicitly learning a particular user's voice and/or speech characteristics, for example, over weeks or months, training/customizing data already generated on the user's single-user device may be supplied to and/or implemented in the hub (e.g., after the user's single-user device is discovered by the hub). As a result, the users may be saved the time and/or effort that may be involved with training a speech control device. Depending on variations of the voice and/or speech characteristics of the users of the multi-user device, no single parameterization of the recognition algorithm may be determined that may be suitable for the various users, for example, in the home.

Some users may have difficulty interacting with speech-based UIs because the users may not know what interactions are allowed (e.g., what the users may ask). These users may attempt to determine the capabilities of the speech-based UI through trial and error, for example which may be, for example, time consuming, discouraging, and/or frustrating for the users. The systems and/or methods disclosed herein may be used to improve user satisfaction of multi-user speech devices. Permitted and/or possible user interactions on the user's single-user device may automatically become available on the multi-user speech device as well. For example, after the user's speech profile is integrated into the hub, the names of playlists created on the user's single user device and/or contacts on the user's phone become valid vocabulary terms in the hub. Moreover, other personalization items, such as, for example, desired/correct pronunciations of various names and/or various other user preferences are also integrated into the hub which may increase user satisfaction. Therefore, in some embodiments, not only may the user not have to struggle with the uncertainty of interactions available/allowable via the multi-user speech device and/or with training/customizing of the multi-user speech device's UI, but the user's particular customizations may be available on the multi-user speech device.

Current speech-based UIs of multi-user speech devices may not be able to determine the identity of the user speaking to the multi-user device. Although some current multi-user speech devices, over an extended time frame, may possibly perform, for example, some form of cluster or principal component analysis to determine that multiple speakers are present, the multi-user speech device may not be able to determine the identity of these speakers, just that the speakers are different. The systems and methods disclosed herein may be used for speaker identification in multi-user speech devices. For example, because data associated with the user's speech profile (e.g., vocal model) is tied to the user's user device, after integrating the user's speech profile from the user's user device, the speech profile may be tied to the user's identity within an environment's ecosystem. Accordingly, the systems and methods disclosed herein may provide a strong mapping between who is speaking and the identity of that individual. Identifying information of a user may include, for example, the user's name, the user's user ID in a particular vendor's ecosystem (e.g., as an Apple ID in Apple's ecosystem), contact details of the user, and other information.

The systems and methods disclosed herein may, for example through the discovery process, determine the identities of users associated with the discovered devices, even if those users are not directly interacting with the hub through speech. As a result, a user of the hub may identify one or more users by name in speech commands (e.g., "Start a game between Phil and Sue," where Phil's and Sue's user devices were both discovered by the hub). The user may create compound commands involving multiple people and/or mappings from multiple speech profiles. For example, "Send a message to Keith's wife", spoken by Bill, may use Bill's contact mapping of the contact "Keith" and/or may use Keith's mapping of the term "wife" to resolve the particular user to send the message. These commands may, for example, increase the capabilities of the speech-based UI of the multi-user speech device. Accordingly, a user having never interacted with the multi-user speech device implementing one or more embodiments, may speak an instruction including the names of two other users having never interacted with the multi-user speech device, and the multi-user speech device may be able to identify the three users, interpret the instruction, and execute the instruction.

The systems and methods disclosed herein may, for example, allow for combination of identity information with speaker detection which may lead to unique applications, thereby, for example, improving functionalities available using speech-based UIs of multi-user speech devices. For example, this functionality may be used to implement security or parental controls. A parent, for example, might say "Allow Billy to watch movies only between noon and 3 pm," and later, when an embodiment of the disclosed system receives a speech command, the system determines the identity of the speaker. If, for example, the system determines that the speaker is Billy (e.g., IDENTITY="Billy") then, if outside the allowable time frame defined by Billy's parent, the system may instruct that movie viewing commands are to be rejected. As an additional example, as a result of receiving the speech-based instruction "Allow Eve to control the lights," the system may add Eve to an access control list of valid users whose voice commands are allowed to control certain devices (e.g., the lights).

The following two paragraphs correspond to example scenarios in which the systems and/or methods disclosed herein may be employed.

As a first example scenario, Bob and Alice are husband and wife, and they are longtime iPhone® device users. They have recently purchased a shared home automation hub incorporating one or more embodiments described herein and that may be used in Apple's speech-based ecosystem (e.g., an Apple TV® device modified to incorporate one or more embodiments described herein). Upon bringing the shared hub home and activating it, the shared hub automatically detects the presence of both of their iPhones via Bluetooth LE. An on-screen popup on a display associated with the shared hub asks whether the custom speech profiles from their phones should be integrated into the device. They say "yes," for example, using the Siri Remote® remote. Afterwards, a confirmation appears on each of their phones requesting permission to transmit the profile data to the shared hub. Each taps "Confirm" on their respective phones and the data is securely transmitted from each of their phones and is integrated into the speech model of the shared hub. Through this process, the shared hub may determine the Apple IDs of Bob and Alice (the two householders). Later that evening, Alice is away from the home and Bob wants to listen to some music. Bob knows that Alice has a jazz playlist on her phone that he likes. He has his own jazz playlist on his own phone, but he has not yet added most of his favorite songs to his playlist. Bob issues a voice command, "Play Alice's Jazz playlist," to the shared hub. The shared hub may determine that Bob is the user who is currently speaking. Accordingly, if he instead issued the voice command, for example, "Play my jazz playlist," the shared hub would have identified the appropriate corresponding playlist. In this case, however, since he has specified Alice, and the shared hub has discovered Alice's device, the shared hub can determine the referent of the signifier "jazz playlist" in the proper context, and retrieve Alice's jazz playlist on Apple Music. Additionally, for example, since Bob has also configured Siri® to store an indication that "My wife is Alice," he could have alternatively said "Play my wife's jazz playlist," and the shared hub may have determined that, in the context of Bob's speech profile, the term "wife" refers to Alice and may have retrieved the appropriate corresponding playlist. Moreover, Bob is also impressed that not only does the example shared hub recognize his speech similarly to Siri®'s recognition on his individual iPhone, but also that custom pronunciations that he took the time to create on his phone are present automatically on the shared hub. For example, when he asks "what artist performed this song," the shared hub may respond with the desired/correct pronunciation of "Pat Metheny" that Bob previously customized on his individual phone, as opposed to a default phonetic pronunciation.

As a second example scenario, Bob and Alice are heading out for the evening, leaving their 12-year old son at home. They know that he tends to play too many video games, so Alice says to the example shared hub from the first example scenario, "Tim can only play video games before 8 pm this evening," and the shared hub acknowledges the new rule created by Alice. Tim's friend, Steve, comes over to the home. Steve is a recent transplant from England, and is also an iPhone user. Accordingly, when Steve visits, the family's shared hub detects his phone via Bluetooth LE. Similar to the first example scenario, the shared hub displays a dialog pop-up asking whether the speech profile associated with the discovered phone should be integrated into the shared hub. In this example, the shared hub provides/displays the options "Family Member (permanent) or Visitor (temporary) ." Tim clicks "Visitor (temporary)," and Steve's speech profile is temporarily integrated into the shared hub and/or the shared hub also determines that an Apple ID (e.g., Steve's apple ID) is present and associated with that profile. Later, for example, when Steve leaves, any specialized vocabulary and/or other customizations may be removed from the shared hub, for example, so that the family members are not bothered with his customized names or other preferences Steve wants to try out the shared hub, and so he says "Facetime with my mum." Even though Steve has not previously spoken with the shared hub, the shared hub can already identify him and distinguish him from other family members, due to the integration of his speech profile. Thus, for example, not only does the shared hub adapt to his accent and particular terminology ("mum" versus "mom"), but the shared hub may determine that the mother in question is Steve's, not Tim's. Later, Steve requests "play Starcrash between me and Tim" and the shared hub determines that the "me" signifier indicates Steve, not any other user in the home. Other similar requests may likewise be successful, such as "Play my favorites playlist" (e.g., determining which playlist "my" denotes). Finally, later in the evening, Tim tries to show off another new game by saying "Play Call of Duty" but the shared hub identifies that Tim is the speaker, and checks the per-user access control rules. As a result, the shared hub informs Tim that the time is now 8:15 (outside the allowable time for playing video games this evening) and rejects the request.

In some alternative embodiments, users may use their own user devices as an input microphone to the hub, for example, instead of a microphone in the hub. In this embodiment, users speak into their own phones to issue commands to the hub, and the adaptation to the user's speech profile may occur, for example, locally before being transmitted to the hub. In this embodiment, assurance of speaker identification may be increased since users are likely to use their own user devices for speech-based control.

Systems and/or methods disclosed herein may employ an individual's user device (e.g., the user's mobile device) as a proxy for the individual and/or as a carrier of information associated with the individual that may be dynamically integrated into a multi-user device, such as, for example a smart home hub. In some embodiments, for example, the example hub may negotiate with example user devices to retrieve users' musical preferences. When multiple users are present (e.g., when multiple user devices are discovered by the hub), multiple users' musical preferences may be retrieved, and the intersection of the musical preferences may be used to create a dynamic playlist, for example, that may appeal to all of the users. In some embodiments, the hub may negotiate with the user device to retrieve applications or other content, which may then be playable/viewable via the hub for as long as the user device is present (e.g., discoverable), for example, therefore allowing multiple people in the home to experience a game purchased by one member, without all members having to purchase the game. For example, a user with a new game may be able to go to a friend's home and may have the game transiently appear on a display associated with the home's shared hub for joint play.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary embodiments disclosed herein are implemented using one or more wired and/or wireless network nodes, such as a wireless transmit/receive unit (WTRU) or other network entity.

Figure 7:
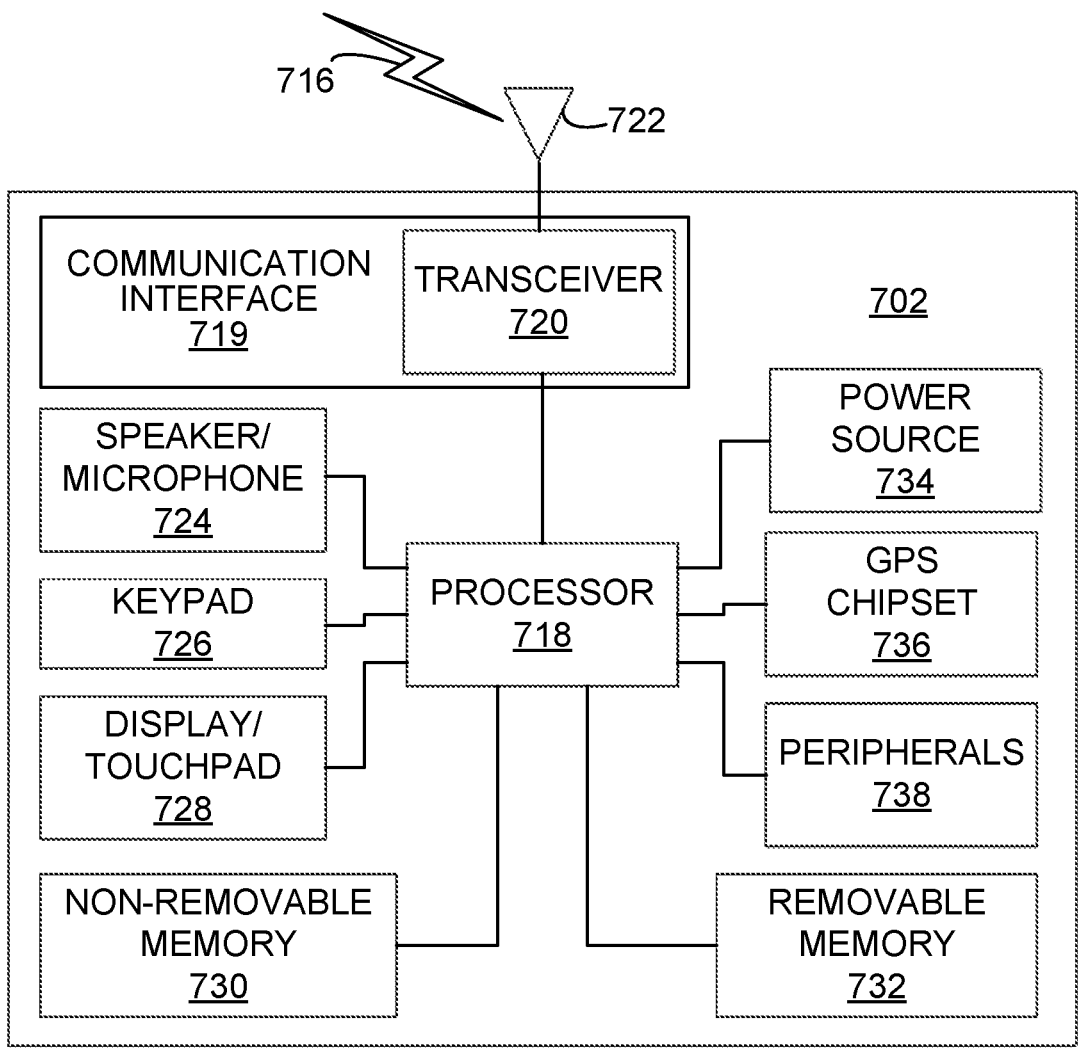
FIG. 7 is an exemplary wireless transmit/receive unit (WTRU) that may be employed as an exemplary communications device (e.g., user device and/or hub) in some embodiments.

FIG. 7 is a system diagram of an exemplary WTRU 702, which may be employed as a user device and/or hub in embodiments described herein. As shown in FIG. 7, the WTRU 702 may include a processor 718, a communication interface 719 including a transceiver 720, a transmit/receive element 722, a speaker/microphone 724, a keypad 726, a display/touchpad 728, a non-removable memory 730, a removable memory 732, a power source 734, a global positioning system (GPS) chipset 736, and sensors 738. It will be appreciated that the WTRU 702 may include any sub-combination of the foregoing elements while remaining consistent with an embodiment.

The processor 718 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 718 may perform signal coding, data processing, power control, input/output processing, and/or any other functionality that enables the WTRU 702 to operate in a wireless environment. The processor 718 may be coupled to the transceiver 720, which may be coupled to the transmit/receive element 722. While FIG. 7 depicts the processor 718 and the transceiver 720 as separate components, it will be appreciated that the processor 718 and the transceiver 720 may be integrated together in an electronic package or chip.

The transmit/receive element 722 may be configured to transmit signals to, or receive signals from, a base station over the air interface 716. For example, in one embodiment, the transmit/receive element 722 may be an antenna configured to transmit and/or receive RF signals. In another embodiment, the transmit/receive element 722 may be an emitter/detector configured to transmit and/or receive IR, UV, or visible light signals, as examples. In yet another embodiment, the transmit/receive element 722 may be configured to transmit and receive both RF and light signals. It will be appreciated that the transmit/receive element 722 may be configured to transmit and/or receive any combination of wireless signals.

In addition, although the transmit/receive element 722 is depicted in FIG. 7 as a single element, the WTRU 702 may include any number of transmit/receive elements 722. More specifically, the WTRU 702 may employ MIMO technology. Thus, in one embodiment, the WTRU 702 may include two or more transmit/receive elements 722 (e.g., multiple antennas) for transmitting and receiving wireless signals over the air interface 716.

The transceiver 720 may be configured to modulate the signals that are to be transmitted by the transmit/receive element 722 and to demodulate the signals that are received by the transmit/receive element 722. As noted above, the WTRU 702 may have multi-mode capabilities. Thus, the transceiver 720 may include multiple transceivers for enabling the WTRU 702 to communicate via multiple RATs, such as UTRA and IEEE 802.11, as examples.

The processor 718 of the WTRU 702 may be coupled to, and may receive user input data from, the speaker/microphone 724, the keypad 726, and/or the display/touchpad 728 (e.g., a liquid crystal display (LCD) display unit or organic light-emitting diode (OLED) display unit). The processor 718 may also output user data to the speaker/microphone 724, the keypad 726, and/or the display/touchpad 728. In addition, the processor 718 may access information from, and store data in, any type of suitable memory, such as the non-removable memory 730 and/or the removable memory 732. The non-removable memory 730 may include random-access memory (RAM), read-only memory (ROM), a hard disk, or any other type of memory storage device. The removable memory 732 may include a subscriber identity module (SIM) card, a memory stick, a secure digital (SD) memory card, and the like. In other embodiments, the processor 718 may access information from, and store data in, memory that is not physically located on the WTRU 702, such as on a server or a home computer (not shown).

The processor 718 may receive power from the power source 734, and may be configured to distribute and/or control the power to the other components in the WTRU 702. The power source 734 may be any suitable device for powering the WTRU 702. As examples, the power source 734 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 718 may also be coupled to the GPS chipset 736, which may be configured to provide location information (e.g., longitude and latitude) regarding the current location of the WTRU 702. In addition to, or in lieu of, the information from the GPS chipset 736, the WTRU 702 may receive location information over the air interface 716 from a base station and/or determine its location based on the timing of the signals being received from two or more nearby base stations. It will be appreciated that the WTRU 702 may acquire location information by way of any suitable location-determination method while remaining consistent with an embodiment.

The processor 718 may further be coupled to other peripherals 738, which may include one or more software and/or hardware modules that provide additional features, functionality and/or wired or wireless connectivity. For example, the peripherals 738 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8:
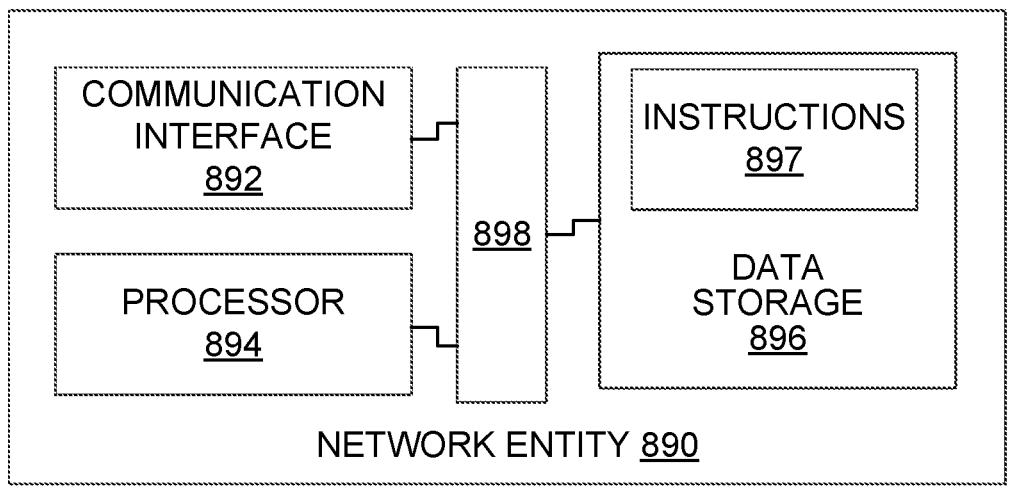
FIG. 8 is an exemplary network entity that may be employed as an exemplary communications device (e.g., network and/or remote server/cloud) in some embodiments.

FIG. 8 depicts an exemplary network entity 890 that may be used in embodiments of the present disclosure, for example as an exemplary communications device. As depicted in FIG. 8, network entity 890 includes a communication interface 892, a processor 894, and non-transitory data storage 896, all of which are communicatively linked by a bus, network, or other communication path 898.

Communication interface 892 may include one or more wired communication interfaces and/or one or more wireless-communication interfaces. With respect to wired communication, communication interface 892 may include one or more interfaces such as Ethernet interfaces, as an example. With respect to wireless communication, communication interface 892 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 892 may be equipped at a scale and with a configuration appropriate for acting on the network side—as opposed to the client side—of wireless communications (e.g., LTE communications, Wi-Fi communications, and the like). Thus, communication interface 892 may include the appropriate equipment and circuitry (perhaps including multiple transceivers) for serving multiple mobile stations, UEs, or other access terminals in a coverage area.

Processor 894 may include one or more processors of any type deemed suitable by those of skill in the relevant art, some examples including a general-purpose microprocessor and a dedicated DSP.

Data storage 896 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 8, data storage 896 contains program instructions 897 executable by processor 894 for carrying out various combinations of the various network-entity functions described herein.

In another example, a method of providing multi-user speech control is provided. The method includes determining a first speaker identity from a plurality of speaker identities based upon characteristics of received audio data. The method also includes determining an instruction from the received audio data, the instruction comprising a speaker-relative signifier. The method also includes performing an action associated with the instruction determined from the received audio data, wherein the action associated with the instruction is determined based upon the first speaker identity, comprising: determining a referent of the speaker-relative signifier from the instruction based upon first speaker profile data associated with the first speaker identity, wherein the first speaker profile data are received from a mobile device associated with the first speaker identity.

In a sub-example of this example, the determining of the first speaker identity comprises using speech profile data from first speaker profile data.

In a sub-example of this example, the determining of the first speaker identity comprises using speech profile data from first speaker profile data.

In a sub-example of this example, the first speaker identity includes speech profile data.

In a sub-example of this example that is additional or alternative to any proceeding sub-example, the determining of the instruction comprises using vocabulary data from the first speaker profile data.

In a sub-example of this example that is additional or alternative to any proceeding sub-example, the speaker-relative signifier refers to a familial relation or a location associated with a speaker identity.

In a sub-example of this example that is additional or alternative to any proceeding sub-example, the first speaker identity is determined based upon a comparison of probabilities.

In a sub-example of this example that is additional or alternative to any proceeding sub-example, the first speaker identity is determined based upon a confidence.

In a sub-example of this example that is additional or alternative to any proceeding sub-example, the determining of the first speaker identity is based upon a comparison of the received audio data to one or more audio signatures.

In another example, a system comprising a processor and a non-transitory storage medium storing instructions operative, when executed by the processor, to perform the functions of: determining a first speaker identity from a plurality of speaker identities based upon characteristics of received audio data; determining an instruction from the received audio data, the instruction comprising a speaker-relative signifier; and performing an action associated with the instruction determined from the received audio data. In this example, the action associated with the instruction is determined based upon the first speaker identity, comprising: determining a referent of the signifier from the instruction based upon first speaker profile data associated with the first speaker identity, wherein the first speaker profile data are received from a mobile device associated with the first speaker identity.

In another example, a method of speech-based control of a hub is provided. The method includes discovering a first device wirelessly. The method also includes receiving first speaker profile data generated by the first device, the first speaker profile data and the first device being associated with a first speaker identity. The method also includes receiving voice input spoken by a first user of the hub, the hub being wirelessly connected to the first device. The method also includes determining the first speaker identity from a plurality of speaker identities, the determining being based on characteristics of the voice input spoken by the first user of the hub. The method also includes determining an instruction and a speaker-relative signifier included within the instruction, both being determined from the voice input spoken by the first user of the hub. The method also includes determining a referent of the signifier included within the instruction, the determining being based on the first speaker profile data associated with the first speaker identity. The method also includes executing an action corresponding to the instruction, the action being determined based on the referent.

In a sub-example of this example, the determining of the first speaker identity from the plurality of speaker identities comprises processing the received voice input spoken by the first user of the hub.

In a sub-example of the proceeding sub-example, the processing of the received voice input comprises adjusting recognition parameters associated with the hub.

In a sub-example of the proceeding sub-example, the adjusting of the recognition parameters associated with the hub comprises augmenting the recognition parameters associated with the hub with recognition parameters associated with the first speaker profile data.

In a sub-example of this example, the determining of the referent of the speaker-relative signifier included within the instruction comprises retrieving a mapping of the signifier with a particular word or phrase in the first speaker profile data.

In a sub-example of this example, the first speaker profile data generated by the first device was generated through a plurality of interactions of the first speaker with the first device.

In a sub-example of this example, the executed action is associated with control of a second device or a service.

In a sub-example of this example, the determining of the referent of the signifier included within the instruction is based on profile data associated with a user referenced in the instruction.

In another example, a system comprising a processor and a non-transitory storage medium storing instructions operative, when executed by the processor, to perform the functions of discovering a first device wirelessly, receiving first speaker profile data generated by the first device, the first speaker profile data and the first device being associated with a first speaker identity, receiving voice input spoken by a first user of the hub, the hub being wirelessly connected to the first device, determining the first speaker identity from a plurality of speaker identities, the determining being based on characteristics of the voice input spoken by the first user of the hub, determining an instruction and a speaker-relative signifier included within the instruction, both being determined from the voice input spoken by the first user of the hub, determining a referent of the signifier included in the instruction, the determining being based on the first speaker profile data associated with the first speaker identity, and executing an action corresponding to the instruction, the action being determined based on the referent.

In another example, a method in provided. The method includes receiving, from a mobile device of a first user, (i) first speech profile data of the first user and (ii) data identifying a first contact associated with a predetermined speaker-relative signifier. The method also includes receiving, from a mobile device of a second user, (i) second speech profile data of the second user and (ii) data identifying a second contact associated with the predetermined speaker-relative signifier. The method also includes receiving an audio command that includes the predetermined speaker-relative signifier. The method also includes based on at least the first and second speech profile data, identifying a speaker of the audio command. The method also includes in response to an identification of the speaker as the first user, executing the command using the first contact. The method also includes in response to an identification of the speaker as the second user, executing the command using the second contact.

In a sub-example of this example, the command is a command to initiate communications with the contact.

In another example, a method for speech control of a device is provided. The method includes determining a first speaker identity. The method also includes interpreting an instruction based on data associated with the first speaker identity. The method also includes retrieving data associated with a referenced user. The method also includes executing an action associated with the instruction based on the data associated with the first speaker identity and the referenced user.

In another example, a method is provided. The method includes wirelessly communicating with a plurality of user devices to retrieve pre-generated and pre-tuned speech profiles associated with users of the corresponding user devices. The method also includes receiving voice input from a user. The method also includes determining an identity of the user. The method also includes retrieving customizations from the user's speech profile. The method also includes performing an action related to content of the voice input.

In another example, a method of providing multi-user speech control is provided. The method includes identifying a speaker from a plurality of known speakers based on characteristics of received audio. The method also includes determining a command from the received audio, wherein the command includes a user-relative phrase. The method also includes resolving the user-relative phrase based on speaker profile data associated with the speaker identity. The method also includes performing an action associated with the command.

In a sub-example of this example, the speaker profile data is received from a mobile device of the speaker.

Systems and methods are provided for speech-based recognition of users and/or speech-based control of multi-user speech devices, the multi-user speech devices having a plurality of users. Each of the plurality of users may have a respective speech profile that is generated and/or tuned via the respective user's single-user device. The multi-user device may discover single-user devices via a discovery protocol and may receive the speech profile associated with the corresponding user of the single-user device. Each received speech profile is integrated into the voice and/or speech recognition processing associated with the multi-user device, and, as a result, the multi-user device may be able to recognize and/or determine an identity of the user-speaker and/or other users having discovered single-user devices. The multi-user device may also be able to recognize and/or execute instructions spoken by a particular user that include the particular user's customized terms and/or mappings from the user's integrated speech profile.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
receiving audio data representing a voice input;
identifying a first user as providing the voice input based on characteristics of the received audio data;
determining an instruction from the received audio data, wherein the voice input references a second user other than the first user, and wherein determining the instruction includes determining a referent of a signifier in the voice input based on speaker profile data associated with the second user; and
operating a home automation hub to control a second device or service to perform an action indicated by the instruction.

2. The method of claim 1, wherein the method is performed by a cloud-based service, and wherein receiving audio data comprises receiving audio data over a network.

3. The method of claim 1, wherein receiving audio data comprises collecting audio data at a microphone of a home automation hub.

4. The method of claim 1, further comprising causing an action indicated by the instruction to be performed.

5. The method of claim 1, wherein identifying the first user comprises comparing the received audio data with voice-recognition data of a plurality of users including the first user.

6. The method of claim 1, wherein the method is performed by a home automation hub.

7. The method of claim 1, wherein determining the instruction includes identifying the second user using at least one relationship mapping between the first user and the second user.

8. The method of claim 7, wherein the relationship mapping identifies a familial relation between the first and second user.

9. The method of claim 1, wherein the instruction is an instruction to play a playlist associated with the second user, the method further comprising causing the playlist to be played.

10. The method of claim 1, wherein the instruction is an instruction to contact a person identified in the speaker profile data associated with the second user, the method further comprising initiating contact with the person.

11. A system comprising at least one processor configured to perform:
receiving audio data representing a voice input;
identifying a first user as providing the voice input based on characteristics of the received audio data;
determining an instruction from the received audio data, wherein the voice input references a second user other than the first user, and wherein determining the instruction includes determining a referent of a signifier in the voice input based on speaker profile data associated with the second user; and
operating a home automation hub to control a second device or service to perform an action indicated by the instruction.

12. The system of claim 11, wherein the system is a cloud-based service, and wherein receiving audio data comprises receiving audio data over a network.

13. The system of claim 11, wherein receiving audio data comprises collecting audio data at a microphone of a home automation hub.

14. The system of claim 11, wherein the processor is further configured to cause an action indicated by the instruction to be performed.

15. The system of claim 11, wherein identifying the first user comprises comparing the received audio data with voice-recognition data of a plurality of users including the first user.

16. The system of claim 11, wherein determining the instruction includes identifying the second user using at least one relationship mapping between the first user and the second user.

17. The system of claim 11, wherein the processor is further configured to control a second device or service to perform an action indicated by the instruction.

18. The system of claim 11, wherein the instruction is an instruction to play a playlist associated with the second user, the processor further being configured to cause the playlist to be played.

19. The system of claim 11, wherein the instruction is an instruction to contact a person identified in the speaker profile data associated with the second user, the processor further being configured to initiate contact with the person.

* * * * *